United States Patent
Garrido Ariza et al.

(10) Patent No.: US 12,486,174 B2
(45) Date of Patent: Dec. 2, 2025

(54) REDUCED GRAPHENE OXIDE FILM COMPRISING A STACK OF rGO LAYERS AND ITS APPLICATIONS

(71) Applicants: FUNDACIÓ INSTITUT CATALÀ DE NANOCIÈNCIA I NANOTECNOLOGIA (ICN2), Bellaterra (ES); INSTITUCIÓ CATALANA DE RECERCA I ESTUDIS AVANÇATS, Barcelona (ES); THE UNIVERSITY OF MANCHESTER, Manchester (GB)

(72) Inventors: José Antonio Garrido Ariza, Sant Just Desvern (ES); Damià Viana, Barcelona (ES); Kostantinos Kostarelos, Barcelona (ES); Christopher John Bullock, Manchester (GB); Cyrill Bussy, Salford (GB); Steven Tremayne Walston, Glendale, CA (US)

(73) Assignees: FUNDACIÓ INSTITUT CATALÀ DE NANOCIENCIA I NANOTECNOLOGIA (ICN2), Bellaterra (ES); INSTITUCIÓ CATALANA DE RECERCA I ESTUDIS AVANATS, Barcelona (ES); THE UNIVERSITY OF MANCHESTER, Manchester (GB)

( * ) Notice: Subject to any disclaimer, the term of this patent is extended or adjusted under 35 U.S.C. 154(b) by 993 days.

(21) Appl. No.: 17/310,894

(22) PCT Filed: Feb. 27, 2020

(86) PCT No.: PCT/EP2020/055195
§ 371 (c)(1),
(2) Date: Sep. 15, 2021

(87) PCT Pub. No.: WO2020/174066
PCT Pub. Date: Sep. 3, 2020

(65) Prior Publication Data
US 2022/0144644 A1    May 12, 2022

(30) Foreign Application Priority Data
Feb. 27, 2019 (EP) .................................. 19382146

(51) Int. Cl.
C01B 32/198 (2017.01)

(52) U.S. Cl.
CPC ........ C01B 32/198 (2017.08); *C01P 2002/72* (2013.01); *C01P 2002/74* (2013.01); *C01P 2002/82* (2013.01); *C01P 2002/85* (2013.01); *C01P 2006/40* (2013.01)

(58) Field of Classification Search
CPC ..... C01B 32/198; C01B 32/23; C01B 32/192; C01B 32/182; C01B 32/184; C01B 32/186; C01B 32/188; C01B 32/19; C01B 32/194; C01B 32/196; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01P 2002/72; C01P 2002/74; C01P 2002/82; C01P 2002/85; C01P 2006/40; C01P 2004/04; H01G 11/36

See application file for complete search history.

(56) References Cited

U.S. PATENT DOCUMENTS

| | | |
|---|---|---|
| 2014/0370274 A1 | 12/2014 | Lee |
| 2015/0103469 A1 | 4/2015 | Lee et al. |
| 2016/0144321 A1 | 5/2016 | Hung et al. |
| 2017/0018761 A1 | 1/2017 | Ogino |
| 2017/0178824 A1 | 6/2017 | Kaner et al. |
| 2017/0182474 A1 | 6/2017 | Zhamu et al. |
| 2017/0217775 A1 | 8/2017 | Sohn et al. |
| 2017/0221643 A1 | 8/2017 | Zhamu et al. |
| 2018/0001267 A1* | 1/2018 | Lee ........................ B01D 69/02 |

FOREIGN PATENT DOCUMENTS

| | | |
|---|---|---|
| CN | 105084355 A | 11/2015 |
| CN | 105542333 A | 5/2016 |
| CN | 106430161 A | 2/2017 |

(Continued)

OTHER PUBLICATIONS

Gao, et al., Free-Standing Reduced Graphene Oxide Paper with High Electrical Conductivity, Journal of Electronic Materials 2016; 45(3): 1290-1295 (Year: 2016).*

(Continued)

*Primary Examiner* — Daniel C. McCracken
(74) *Attorney, Agent, or Firm* — McCoy Russell LLP

(57) ABSTRACT

It relates to an reduced graphene oxide (rGO) film having a total thickness from 20 nm to 5 micrometer, which comprises a stack of rGO layers comprising flakes, wherein the distance between two consecutive layers is from 0.2 to 0.7 nm, and to an electrically back-contacted conductive reduced graphene oxide (rGO) structure comprising it together with an additional conductive support on which the rGO is deposited. It also relates to a process for the preparation of the rGO film and the electrically back-contacted conductive rGO structure, and to electronic devices for detecting, receiving and/or inducing electrical signals.

14 Claims, 7 Drawing Sheets

(56) References Cited

FOREIGN PATENT DOCUMENTS

| CN | 107261857 A | 10/2017 |
| JP | 2018506418 A | 3/2018 |
| WO | 2017021936 A1 | 2/2017 |
| WO | 2018039715 A1 | 3/2018 |

OTHER PUBLICATIONS

Mungse, et al., Hydrothermal deoxygenation of graphene oxide in sub- and supercritical water, RSC Adv. 2014; 4: 22589-22595 (Year: 2014).*

European Patent Office, Office Action Issued in Application No. 19382146.9, Jan. 18, 2022, Netherlands, 9 pages.

Badia, J. et al., "Comparative analysis of transverse intrafascicular multichannel, longitudinal intrafascicular and multipolar cuff electrodes for the selective stimulation of nerve fascicles," Journal of Neural Engineering, vol. 8, No. 3, Jun. 2011, Available Online May 11, 2011, 14 pages.

Hess, L. et al., "Graphene Transistors for Bioelectronics," Proceedings of the IEEE, vol. 101, No. 7, May 24, 2013, 13 pages.

Mousavi, H. et al., "Flake Electrical Conductivity of Few-Layer Graphene," Hindawi Publishing Corporation, vol. 2014, No. 581478, Jan. 16, 2014, 7 pages.

Hebert, C. et al., "Flexible Graphene Solution-Gated Field-Effect Transistors: Efficient Transducers for Micro-Electrocorticography," Advanced Functional Materials, vol. 28, No. 12, Nov. 13, 2017, 16 pages.

Taer, E. et al., "The relationship of surface area to cell capacitance for monolith carbon electrode from biomass materials for supercapacitor application," Journal of Physics Conference Series, vol. 1116, No. 3, Dec. 2018, 7 pages.

ISA European Patent Office, International Search Report Issued in Application No. PCT/EP2020/055195, May 26, 2020, WIPO, 3 pages.

Son, G. et al., "Solution-processed highly adhesive graphene coatings for corrosion inhibition of metals," Nano Research, vol. 12, No. 1, Apr. 2018, 8 pages.

Intellectual Property Office of Singapore, Search Report Issued in Application No. 11202109019X, Oct. 3, 2022, 183 pages.

Intellectual Property Office of Singapore, Written Opinion Issued in Application No. 11202109019X, Oct. 3, 2022, 7 pages.

Guex, L. et al., "Experimental review: chemical reduction of graphene oxide (GO) to reduced graphene oxide (rGO) by aqueous chemistry," Nanoscale, vol. 9, No. 27, Jun. 7, 2017, 10 pages.

European Patent Office, Extended European Search Report Issued in Application No. 25159718.3, Sep. 8, 2025, Germany, 10 pages.

* cited by examiner

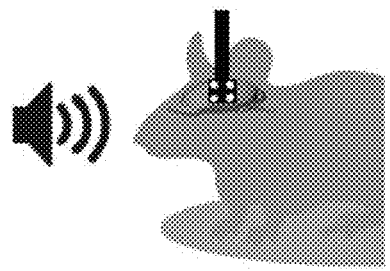
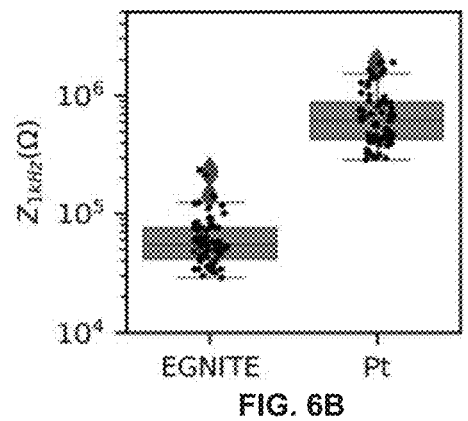
FIG. 6A
FIG. 6B
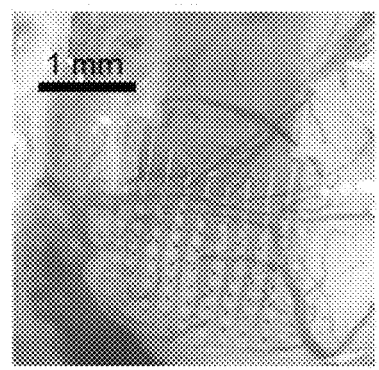
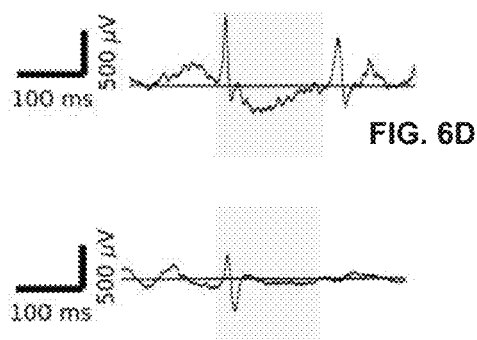
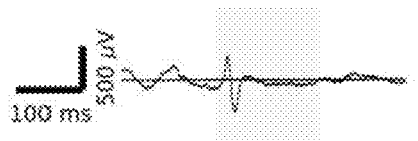
FIG. 6C
FIG. 6D
FIG. 6E
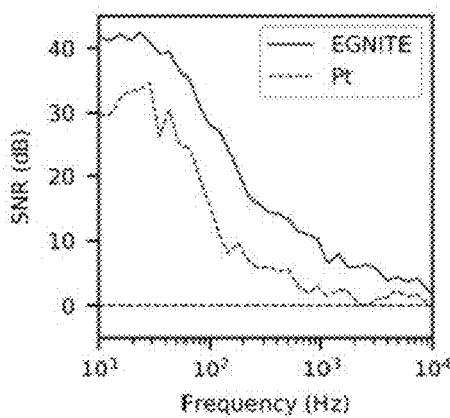
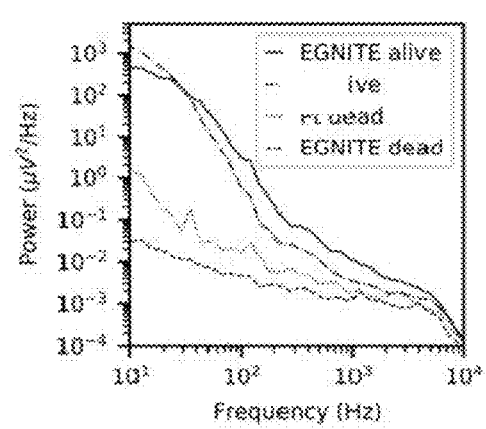
FIG. 6F
FIG. 6G

REDUCED GRAPHENE OXIDE FILM COMPRISING A STACK OF rGO LAYERS AND ITS APPLICATIONS

CROSS REFERENCE TO RELATED APPLICATIONS

The present application claims priority to European Patent Application 19382146.9 filed on Feb. 27, 2019. The project leading to the present application has received funding from the Graphene Flagship programme (Graphene Core2) under the European Union's Horizon 2020 research and innovation programme (grant agreement No 785219). The entire contents of the above-listed application is hereby incorporated by reference for all purposes.

TECHNICAL FIELD

The present disclosure relates to reduced graphene oxide (rGO) films comprising a stack of rGO layers which exhibit high electrical conductivity in electrolyte-based systems. These rGO films can be integrated in devices in which high and fast charge injection is required, such as implantable electronic devices for neural interfacing (e.g. neural stimulators for deep brain stimulation or peripheral nervous system stimulation, cochlear and retinal implants, pacemakers, brain-computer interfaces, etc.).

BACKGROUND AND SUMMARY

Neuroprosthetic devices are powerful tools to monitor, prevent and treat neural diseases, disorders and conditions by interfacing electrically with the nervous system. They are capable of recording and stimulating electrically neural activity once implanted in the nervous tissue. Currently, most neuroprosthetic technologies base their interface with the neural tissue on electrodes.

The interfacing can occur through Faradaic or capacitive currents. One the one hand side, Faradaic currents are associated to redox reactions taking place in the electrode/tissue interface. Those reactions end up degrading the electrode and damaging the tissue.

On the other hand side, capacitive currents are due to the charge and discharge of the double layer that appears when an electrical conductor is placed in a liquid environment. For implants, capacitive currents are always preferred over the Faradaic ones since they do not harm the tissue nor degrade the electrode material. Thus, high capacitances are ideal to achieve effective and safe interfacing with the neural tissue. The capacitance sets performance values such as the charge injection limit (CIL) of the material and its impedance. High levels of charge injection and low impedances are desired when recording and stimulating the neural activity of the nervous system. The size of electrodes is limited by the performance of the materials they are made of; materials with high performance, in terms of high capacitance, allow higher levels of miniaturization.

Interface precision and device durability, however, are aspects to be improved in order to increase the acceptance of the technology, improve its therapeutic application, and reduce post-operatory complications. The interface precision can be improved by reducing electrodes sizes and increasing the resolution of electrodes arrays. Typically, electrodes exhibit miniaturization limitations due to the intrinsic impedance and charge injection limit (CIL) of the materials they are made of. The durability of the devices depends on the chemical stability of the electrodes material, its biocompatibility, and its mechanical compliance with the living tissue.

The immune response of the body to the materials is another factor to take into account when implanting devices in living tissue. For example, scar tissue formation and inflammation around the implant area can occur. The immune response tends to encapsulate foreign bodies, which decrease the electrical performance of the device over time. Those materials possessing a strong stiffness mismatch with the tissue where are implanted are more aggressively attacked by the body. Therefore, flexible and soft materials are desired over rigid or thick ones. Thin devices are also necessary to minimize the immune response.

Long term stability of the material is also a crucial aspect to consider for chronic implants, being required materials with high chemical and mechanical stabilities.

Standard commercially available neural interfaces are based on metallic microelectrodes made of Pt, platinum-iridium (Pt/Ir), iridium oxide (IrOx) or titanium nitride (TiN). Those materials interact with the living tissue through a combination of Faradaic and capacitive currents, offer a limited chemical stability and are rigid. Metals performance strongly drops in microelectrodes of tens of micrometres in diameter; further, metals degrade over continuous tissue stimulation.

Recently, conductive polymers, such as the polymer mixture poly(3,4-ethylenedioxythio-phene) polystyrene sulfonate (PEDOT:PSS), have emerged as promising candidates to overcome metallic microelectrodes limitations. However, when implanted, its interface with the tissue is also through a combination of Faradaic and capacitive currents. By improving the impedance and CIL of metals, together with their flexibility, higher performance in the recording and stimulation of neural tissue can be achieved. However, delamination can occur, thereby compromising the long-term stability. It has been described that PEDOT:PSS has problems during the stimulation since it degrades chemically and mechanically when is under operation.

Graphene is a material with very interesting properties for neural interfacing. Being electrically conductive, flexible, mechanically robust and highly inert, it is a good candidate for safe electrical interfacing in aqueous environments. The performance of single layer graphene microelectrodes, however, is far from being optimal for neural interfacing, such as for applications requiring stimulation of the neural tissue. As the impedance is limited by the capacitance of the graphene/tissue interface and the stimulation is a capacitive process, three-dimensional porous graphene-based materials with large area to volume ratios have been suggested to overcome this issue. However, it has been reported that such graphene materials processed from flakes including the porous graphene-based materials reported to date, including those ones made of reduced graphene oxide (rGO), require thicknesses in the range of hundreds of micrometers to achieve valid properties for the stimulation.

Therefore, there is still an interest in developing long-lasting, high performance and thin graphene-based materials that can be easily integrated in devices to overcome the problems of the prior art.

The inventors have developed stable thin films of reduced graphene oxide (rGO) comprising a stack of rGO flakes, which show a significantly increased electrochemical active surface area compared to an atomic monolayer of carbon (single layer graphene). As a result, these rGO films are capable of providing high charge injection properties in an efficient and consistent manner for the duration of its functional lifetime. These graphene materials may be used in the fabrication of electronic devices, such as microelectrodes, which exhibit low interfacial impedance (Z), extremely high charge injection limit (CIL), and outstanding stability. These rGO films are highly porous.

The rGO films of the disclosure are flexible, and mechanically and chemically highly stable in aqueous solutions. Besides, their production is easily scalable and compatible with massive manufacturing processes.

Electronic devices comprising the rGO films of the disclosure when used as neural interfaces have the advantage that they can be used safely when they are implanted into the body, because they show good biocompatibility. As illustrated by the examples, the rGO films of the disclosure showed biocompatibility with cells that are encountered in a neural tissue environment. Besides, due to the fact that the upper surface of the rGO film of the disclosure which is in direct contact with biological tissue has low roughness, the rGO films of the disclosure do not damage the tissue nor exfoliates or leaves undesired residues. Consequently, these implants have minimal inflammatory (local or systemic) responses from the neural tissue.

Additionally, because of their high conductivity and charge injection capacity, the devices comprising the rGO materials of the disclosure can be miniaturized (e.g. diameter lower than about 10 μm and thickness lower than about 1 μm), thereby extending their functionality to interface with the nervous system to areas about 25 times smaller than current commercial technology on the one hand, and being minimally invasive on the other hand. Furthermore, if it is desired to study larger areas of the body, the devices comprising the rGO films of the disclosure can be arranged in the form of arrays of varying density.

Finally, as it will be shown in the examples, the devices comprising the rGO material of the disclosure, achieve a significant improvement in signal-to-noise ratio (SNR) and substantial reduction in electrical interference noise compared to gold electrodes. They allow detection of assemblies of neurons and even signals of individual neurons (noise levels equal to or below about 3 μV root mean square (rms) for electrodes with a diameter of about 25 μm) and of assemblies of neurons. They also allow recording over large areas (up to few tens of cm$^2$) and with high spatial resolution (hundreds of μm$^2$ of the active recording site). Additionally, when tested in vivo in rodents, via intraneural implants containing the rGO films of the disclosure, neural stimulation was demonstrated to activate specific subsets of axons within the fascicles of the sciatic nerve with low current thresholds and high selectivity.

All these features (biocompatibility, durability, high performance, suitable charge injection capabilities for stimulation applications, minimized footprint of the material when implanted, small size, etc.) make them especially interesting when used as neural interfaces.

Therefore, a first aspect of the disclosure relates to a reduced graphene oxide (rGO) film having a total thickness from 20 nm to 5 micrometer, which comprises a stack of rGO layers comprising flakes, wherein the distance between two consecutive layers is from 0.2 to 0.7 nm. In an embodiment, the film can be obtainable by a process which comprises the following steps: i) filtering a graphene oxide (GO) solution through a porous membrane thereby forming a GO film on the membrane top, wherein the graphene oxide (GO) solution is and aqueous solution, the concentration of graphene oxide (GO) in the solution is from 0.001 to 5 mg/mL, and the volume filtered is from 5 to 1000 mL;

ii) transferring the GO film from the membrane onto a sacrificial substrate, whereby the GO film is placed between the membrane at the top and the sacrificial substrate at the bottom; iii) removing the membrane, whereby the GO film remains attached onto the sacrificial substrate; iv) hydrothermally reducing the GO film to form a reduced GO material (rGO) at a temperature from 100 to 240° C., under a pressure from $10^5$ to $4 \cdot 10^8$ Pa, for a time period from 1 min to 24 h, in the presence of water; and v) detaching the rGO material from the sacrificial substrate.

In order to improve the capacitive properties of the rGO films of the disclosure, they can be optionally attached to additional conductive materials or supports, such as a Single Layer Graphene (SLG), few layer or multilayer graphene (FLG, MLG), as well as other conductive substrates such as metals, like indium tin oxide, platinum or gold. Thus, another aspect of the disclosure relates to an electrically back-contacted conductive reduced graphene oxide (rGO) structure comprising the rGO film as previously defined, and an additional conductive support on which the rGO is deposited.

Another aspect of the disclosure relates to a process for the preparation of the rGO film as defined above, which comprises the following steps:

filtering a graphene oxide (GO) solution through a porous membrane thereby forming a GO film on the membrane top, wherein the graphene oxide (GO) solution is and aqueous solution, the concentration of graphene oxide (GO) in the solution is from 0.001 to 5 mg/mL, and the volume filtered is from 5 to 1000 mL;

transferring the GO film from the membrane onto a sacrificial substrate, whereby the GO film is placed between the membrane at the top and the sacrificial substrate at the bottom;

removing the membrane, whereby the GO film remains attached onto the sacrificial substrate;

hydrothermally reducing the GO film to form a reduced GO material (rGO), for example, at a temperature from 100 to 240° C., under a pressure from $10^5$ to $4 \cdot 10^8$ Pa, for a time period from 1 min to 24 h, and in the presence of water; and detaching the rGO material from the sacrificial substrate.

Another aspect of the disclosure relates to a process for the preparation of the electrically back-contacted conductive reduced graphene oxide (rGO) structure as defined above, which comprises the following steps:

i') filtering a graphene oxide (GO) solution through a porous membrane thereby forming a GO film on the membrane top, wherein the graphene oxide (GO) solution is and aqueous solution, the concentration of graphene oxide (GO) in the solution is from 0.001 to 5 mg/mL, and the volume filtered is from 5 to 1000 mL;

ii') transferring the GO film from the membrane onto the additional conductive support, whereby the GO film is placed between the membrane at the top and the additional conductive support at the bottom;

iii') removing the membrane, whereby the GO film remains attached onto the additional conductive support; and iv') hydrothermally reducing the GO film to form a reduced GO material (rGO), for example, at a temperature from 100 to 240° C., under a pressure from $10^5$ to $4 \cdot 10^8$ Pa, for a time period from 1 min to 24 h, in the presence of water.

As mentioned above, the rGO-based films of the disclosure, optionally attached to further conductive supports, may be integrated in electronic devices (implantable or not implantable) for neural interfaces. Thus, the rGO film of the disclosure is suitable for being implanted, such as in humans, and can be suitable for detecting, receiving and/or inducing electrical signals in humans.

Accordingly, a further aspect of the disclosure relates to an electronic device for detecting, receiving and/or inducing electrical signals, comprising the rGO film as previously defined or the electrically back-contacted conductive reduced graphene oxide (rGO) structure as defined above.

Another aspect of the disclosure relates to a method for detecting, receiving and/or inducing electrical signals in mammals, such as in humans, comprising the implantation of an electronic device comprising the the rGO film as defined above to a mammal, such as a human being.

Another aspect of the disclosure relates to a method for detecting, receiving and/or inducing electrical signals in mammals, such as humans, comprising the implantation to a mammal, such as a human being, of an electronic device comprising the reduced graphene oxide (rGO) film or the electrically back-contacted conductive reduced graphene oxide (rGO) structure material as defined above.

BRIEF DESCRIPTION OF THE FIGURES

(FIGS. 1A and 1B) filtering a GO solution through a nitrocellulose membrane, (FIG. 1C) transferring the deposited film of stacked GO flakes onto a conductive substrate, and (FIG. 1D) hydrothermally reducing the ensemble.

FIG. 5B STEM Electron energy loss spectroscopy (EELS) elemental maps obtained on the selected area from a. as indicated in the white box by using: C k-edge at 284 eV, O K-edge at 532 eV and Ti L-edge at 456 eV. FIG. 5C Relative atomic composition for C and O. Carbon is present in almost 85% whereas oxygen reaches 15%.

FIGS. 6A-G: Neural activity recording. FIG. 6A Schematic of the experimental setup. A flexible array of microelectrodes was placed on the surface of the auditory cortex while a pure tone of 16 kHz was presented. FIG. 6B Impedance measurements at 1 kHz of the array according to the disclosure (EGNITE) and Pt arrays. FIG. 6C μECog device according to the disclosure placed on the auditory cortex. FIG. 6D Evoked local field potential due to a pure tone of 16 kHz and 200 ms duration (shadow) measured with a microelectrode according to the disclosure. Post mortem signal overlapped. FIG. 6E Idem with Pt microelectrode FIG. 6F Power spectral density (PSD) of the microelectrodes of the disclosure and Pt microelectrodes, both with in in vivo and post mortem conditions. FIG. 6G Signal-to-noise ratio calculated from the ratio of the signals between in vivo and postmortem conditions from FIG. 6F.

FIGS. 7A and 7B Schematic of the implantation of the transversal intrafascicular multielectrode array into the sciatic nerve through the innervations to tibialis anterior (TA), gastrocnemius (GM) and plantar (PL) muscles. FIG. 7C Optical image of the device transversally implanted through the sciatic nerve. FIG. 7D Train of current-controlled stimuli and CMAP of TA, GM and PL muscles. FIG. 7E Plots of TA, GM and PL CMAP amplitude versus intensity of stimulation.

DETAILED DESCRIPTION

Figure 1A:
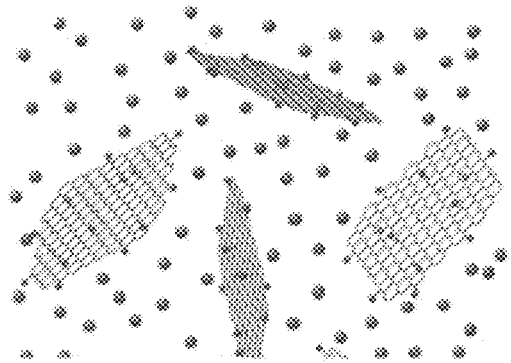
FIGS. 1A through D show an embodiment of the process for the preparation of the rGO film of the disclosure, comprising.
Figure 1B:
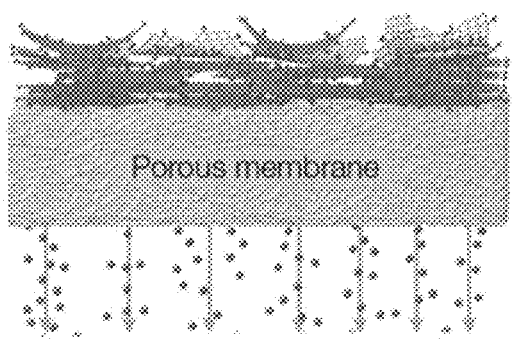
Figure 1C:
Figure 1D:
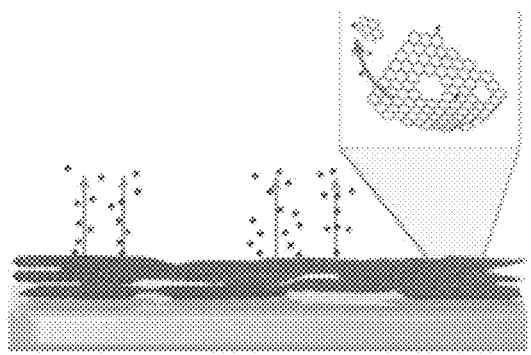

All terms as used herein in this application, unless otherwise stated, shall be understood
in their ordinary meaning as known in the art. Other more specific definitions for certain
terms as used in the present application are as set forth below and are intended to apply uniformly through-out the specification and claims.

The term "about" or "around" as used herein refers to a range of values ±10% of a specified value. For example, the expression "about 10" or "around 10" includes ±10% of 10, i.e. from 9 to 11.

For the purposes of the disclosure, the term "graphene oxide" (GO) refers to a material comprising carbon atoms like graphene but also comprising a population or quantity of oxygen functional groups. The term "reduced graphene oxide" (rGO) refers to graphene oxide (GO) that has been reduced by a reduction process, such as for example a hydrothermal reduction process, and as a consequence has a reduced oxygen content in comparison to the GO before the reduction step (i.e. non-reduced GO). The term "HTrGO" refers to hydrothermally reduced graphene oxide (GO).

The term "electrode" as used herein refers to an electrical conductor that interfaces two media, in this case it connects the body (or tissue from the body) to a device for eliciting electrical signals (e.g. for providing neural stimulation) and/or receiving electrical signals (e.g. for monitoring neural activity).

The term "capacitance" refers to the ratio between the charge stored in the capacitor and the given potential difference. The capacitance is measured in Farads (F).

The term "charge storage capacitance (CSC)" as used herein refers to the maximal amount of charge that a system consisting of two electrically conductive media separated by a dielectric medium can withstand at a given potential difference. To obtain the charge storage capacitance of a system, cyclic voltammetry technique can be performed. For that, the voltage applied to it is varied cyclically and the current measured. The accumulated charge due to the measured current corresponds to the charge storage capacitance. The charge storage capacitance is measured in coulombs (C).

The term "charge injection limit (CIL)" as used herein refers to the maximal amount of charge that can be injected to the electrolyte media through an electrode without inducing irreversible faradaic reactions. Ideally, the charge is injected only through capacitive currents and avoids reversible faradaic reactions. The charge injection limit is measured in $mC/cm^2$.

The term "impedance" as used herein refers to the measure of the opposition that a circuit presents to a current when a voltage is applied. The impedance of an electric circuit can be obtained dividing the current flowing through it by the voltage signal applied. The impedance is measured in Ohms ($\Omega$). According to the behaviour of the current and the voltage, a capacitance can be identified and fitted to the impedance. When referred to electrodes, the impedance is called interfacial impedance.

The term "resistivity" is a property of a material that quantifies how strongly it resists or conducts electric current and is measured in the ohm-meter ($\Omega \cdot m$). High resistivity value indicates that the material is a poor conductor while low values indicate that it is a good conductivity.

The term "stability" of the rGO film as used herein is understood as no increase of the interfacial impedance over continuous electrical pulsing for at least 100 million pulses.

The term "surface area to volume ratio (SAVR)" of the rGO film is the ratio of surface area to volume and is measured in $m^{-1}$. The SAVR can be measured by dividing the surface area by the volume of the rGO film. The surface area of the rGO film can be obtained by dividing the current measured for the rGO film at 0 V in a cyclic voltammetry between –0.9 and 0.9 V in phosphate buffered saline (PBS) electrolyte at a scan rate of 50 mV/s by the value of the scan rate (50 mV/s) times the intrinsic interfacial capacitance of single layer graphene (2-5 $\mu F/cm^2$) (see Taer, E., et al., Journal of Physics: Conference Series, Volume 1116, Issue 3; Hess, Lucas H. et al., Proceedings of the IEEE|Vol. 101, No. 7, July 2013).

The present disclosure relates to reduced graphene oxide (rGO) thin films comprising a stack of rGO layers, which show an increased electrochemical active surface area compared to an atomic monolayer of carbon.

Without being bound to theory, it is thought that the increased electrochemical performance is achieved thanks to both the stacking distance between graphene layers of flakes from 0.2 to 0.7 nm and the open channels that can act as ion transport shortcuts in dense graphene stacks. The opening of the ion transport shortcuts and the interstacking distance is thought to be due to the preparation process of the rGO film of the disclosure comprising the hydrothermal reduction step in which oxygen groups are removed from the basal plane of the flakes.

The increase in the electrochemical active surface area can be proved by measuring the interfacial capacitance of the rGO film in an aqueous solution. In some embodiments of the disclosure, the surface area increases by a factor $10^4$ in films of 1-2 µm thick. This can be derived from impedance spectroscopy data. It can also be proved by the lower resistivity values of the rGO film after reduction in comparison with the higher resistivity values of the non-reduced GO film (FIG. 4C).

In one embodiment, optionally in combination with one or more features of the various embodiments described above or below, a reduced graphene oxide (rGO) film as previously defined, wherein the thickness is from 1000 to 2000 µm (which approximately corresponds to a film comprising about 5000 layers of flakes) and the interstacking distance is about 0.4 nm, has an electrochemical surface area such that is capable of providing a capacitance from 10 to 60 $mF/cm^2$ in an electrolyte-based system, or in an aqueous system.

In one embodiment, optionally in combination with one or more features of the various embodiments described above or below, the surface area to volume ratio (SAVR) of the rGO film as defined above is from $10^8$ to $10^{10}$ $m^{-1}$, measured as defined above.

In one embodiment, optionally in combination with one or more features of the various embodiments described above or below, the reduced graphene oxide (rGO) film as defined above shows resistivity from 0.01 to 10, or from 0.05 to 5 or from 0.1 to 1, or about 0.2 $\Omega \cdot cm$.

The structure of the rGO films of the disclosure comprising a stack of rGO layers comprising flakes may be assessed by different techniques such as SEM, TEM, AFM, HAADF, STEM-EELS, XRD, XPS, and Raman as it will be explained below.

Figure 2A:
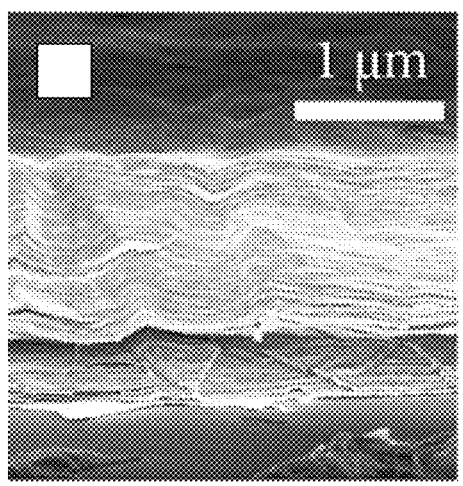
FIG. 2A: SEM micrograph of a cross section of the rGO film of the disclosure, FIG. 2B Atomic force microscope (AFM) image revealing roughness of the upper surface of the rGO film of the disclosure.

For the purposes of the disclosure, the term "stack" as used herein refers to a plurality, i.e. more than one, for example, from 100 to 500000 layers which are aligned or ordered horizontally, i.e. placed one on top of each other. The stacked structure may be assessed by means of Scanning Electron Microscope (SEM) images (FIG. 2A). The term "flake" refers to a material having a flat and thin geometry. A plurality of flakes forms a layer.

The term "stacking" or "interstacking" distance refers to the distance between two consecutive layers or planes of flakes or layers which are deposited one on top of the other and may be measured by X-ray diffraction (XRD) data and high resolution transmission electron (HRTEM).

In one embodiment, optionally in combination with one or more features of the various embodiments described above or below, the flakes are holey flakes. The term "holey flakes" refers to flakes which comprise two-dimensional holes in the rGO structure. The holes in the flakes can also be defined as voids, cavities, openings, or spacings. These spacings also enhance the electrochemical performance and result from the hydrothermal reduction step.

In one embodiment, optionally in combination with one or more features of the various embodiments described above or below, the stack of rGO layers comprises from 100 to 500000, C from 30000 to 100000, or from 30000 to 80000, or from 50000 to 60000, layers of flakes.

As mentioned above, the reduced graphene oxide (rGO) films of the disclosure have a total thickness from 20 nm to 5 micrometer.

In one embodiment, optionally in combination with one or more features of the various embodiments described above or below, the reduced graphene oxide (rGO) film has a total thickness from 500 to 2000 nm or from 25 nm to 1 micrometer, or from 25 to 500 nm, or from 25 to 200 nm. This thickness results in a transparent material and provides a further advantage in some applications since the interface between the transparent electrode and the tissue can be observed by optical techniques.

The thickness of the rGO films of the disclosure can be measured e.g. by scanning and/or transmission electron microscopy (SEM, TEM). FIG. 2A shows a micrograph of a cross section of a rGO film of one embodiment of the disclosure.

Figure 4A:
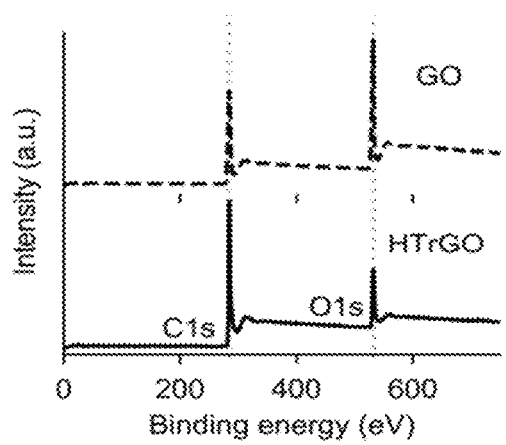
FIG. 4A XPS full spectra of GO and HTrGO showing the C1s and O1s peaks. From their intensity, the carbon-to-oxygen ratio can be calculated.

In one embodiment, optionally in combination with one or more features of the various embodiments described above or below, the reduced graphene oxide (rGO) film of the disclosure shows a X-ray photoelectron spectroscopy (XPS) spectra as depicted in FIG. 4A and/or 4B (see HTrGO).

In another embodiment, optionally in combination with one or more features of the various embodiments described above or below, the reduced graphene oxide (rGO) film of the disclosure has a carbon-to-oxygen ratio (atomic percentage) from 0.8 to 2.0 or from 1.2 to 2.0, or from 1.0 to 1.5 or from 1.6 to 1.8, or about 1.22. The carbon-to-oxygen ratio can be calculated from X-ray photoelectron spectroscopy (XPS).

As mentioned above, the stacking distance in the rGO film of the disclosure is the result of the hydrothermal reduction step used in the preparation of the film. Thus, for example when the stacking distance between flakes of a specific sample was investigated by X-ray diffraction (XRD) before and after the hydrothermal reduction, a decrease from 0.81±0.08 nm before reduction (GO) to 0.39±0.06 nm after reduction (rGO) was observed FIG. 3E).

Figure 3A:
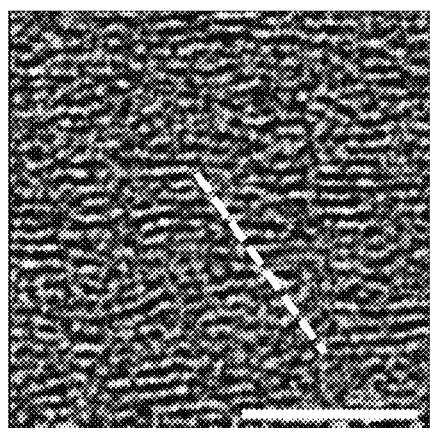
FIG. 3A Cross-sectional view of the rGO film of the disclosure taken by HRTEM along a cross section lamella of the material. Scales bar corresponds to 20 nm.
Figure 3B:
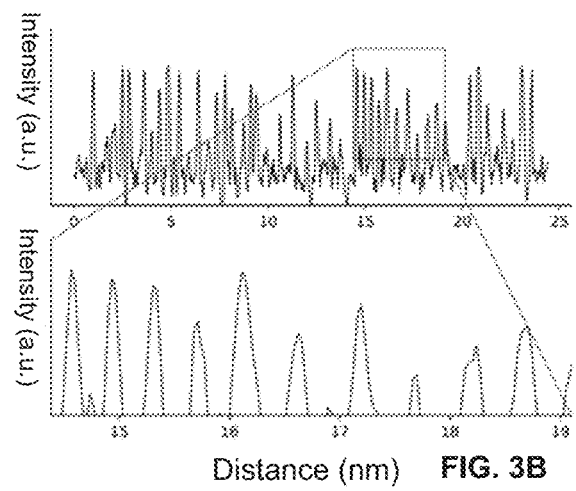
FIG. 3B Profile along the discontinuous line in FIG. 3A; the intensity of the image oscillates periodically every 0.4 nm.
Figure 3C:
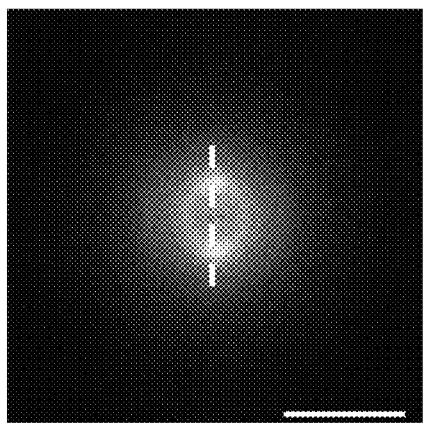
FIG. 3C Power spectrum of FIG. 3A. Scale bar=1/10 nm FIG. 3D Two symmetric peaks appear at 1/2.7 nm indicating a preferential direction in the stacking of the flakes at 0.37 nm.
Figure 3D:
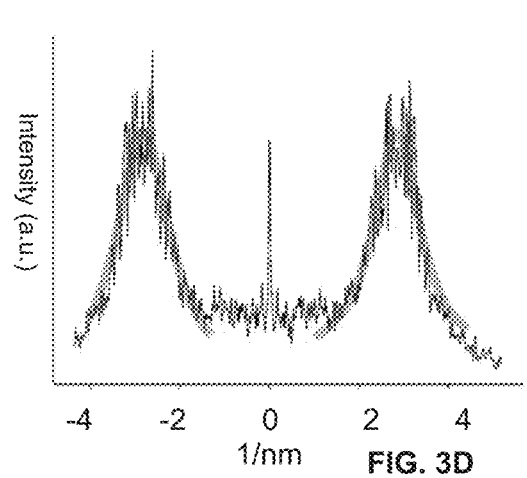
FIG. 3E X-ray diffraction spectra of a GO film (before the hydrothermal reduction) and of the HTrGO film of example 5 on a gold substrate. The GO film exhibits a peak at 11°, characteristic of a parallel stacking of the GO flakes with an interstacking distance of about 0.81 nm in the film; in the rGO film the a peak at 11° has disappeared and a new peak appears at 23°, characteristic of a parallel stacking of the GO flakes with an interstacking distance of about 0.39 nm.
FIG. 3F Average Raman spectrum of GO and HTrGO. The ratio between D and G peaks increases after the hydrothermal treatment.
Figure 3E:
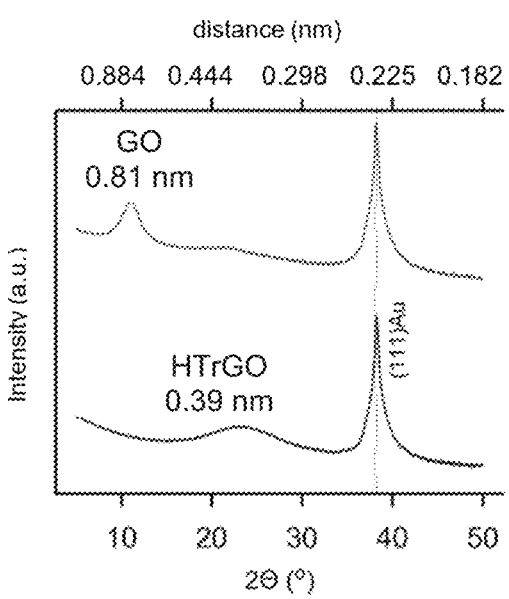

Thus, in one embodiment, optionally in combination with one or more features of the various embodiments described above or below, the reduced graphene oxide (rGO) film of the disclosure has the X-ray diffraction (XRD) spectra as shown in FIG. 3E (see HTrGO).

In one embodiment, optionally in combination with one or more features of the various embodiments described above or below, the reduced graphene oxide (rGO) film of the disclosure shows the profile along the highlighted line in the material cross section (FIG. 3A) measured with HRTEM as depicted in FIG. 3B.

In one embodiment, optionally in combination with one or more features of the various embodiments described above or below, the reduced graphene oxide (rGO) film of the disclosure shows the profile along the highlighted line in the power spectrum of the material cross section (FIG. 3C) as depicted in FIG. 3D.

In one embodiment, optionally in combination with one or more features of the various embodiments described above or below, the distance between two consecutive layers of flakes is from 0.3 to 0.5, or from 0.37 to 0.43, or is about 0.4 nm as measured by X-ray diffraction (XRD).

On the other hand, the X-ray diffraction spectrum of non-reduced GO crystalline film typically exhibits a peak at 11±0.5, σ=4, degrees 2 theta measured in an X-ray diffractometer (XRD) with CuKα radiation (1.540598 Å), which is characteristic of the parallel stacking of the GO (non-reduced) flakes in the film. By contrast, when the GO film is reduced and has a disordered state, this peak is substantially absent in the corresponding X-ray diffraction spectrum (FIG. 3E). XRD measurements (theta-2theta scan) may be performed e.g. in a Materials Research Diffractometer (MRD) from Malvern PANalytical company. This diffractometer has an horizontal omega-2theta goniometer (320 mm radius) in a four-circle geometry and it works with a ceramic X-ray tube with Cu Kα anode (l=1.540598 Å). The detector used is a Pixcel which is a fast X-ray detector based on Medipix2 technology.

Thus, in one embodiment, optionally in combination with one or more features of the various embodiments described above or below, the reduced graphene oxide (rGO) film as defined above shows a X-ray diffraction spectra in which a peak at 11±0.5, σ=4, degrees 2 theta measured in an X-ray diffractometer with CuKα radiation (1.540598 Å) characteristic of non-reduced graphene oxide is substantially absent, i.e. at most, only very short range ordering is present in the rGO film of the disclosure. The term "substantially absent" as used herein refers to a presence of the peak corresponding to non-reduced GO crystalline film of equal to or less than about 1% area/area, or equal to or less than 0.1% area/area. For example, the reduced graphene oxide (rGO) film as defined above shows a X-ray diffraction spectra as shown in FIG. 3E (HTrGO).

In another embodiment, optionally in combination with one or more features of the various embodiments described above or below, the reduced graphene oxide (rGO) film as defined above shows a peak at 23±0.5, σ=4, degrees 2 theta in the X-ray diffraction spectra measured in an X-ray diffractometer with CuKα radiation (1.540598 Å)

Figure 2B:
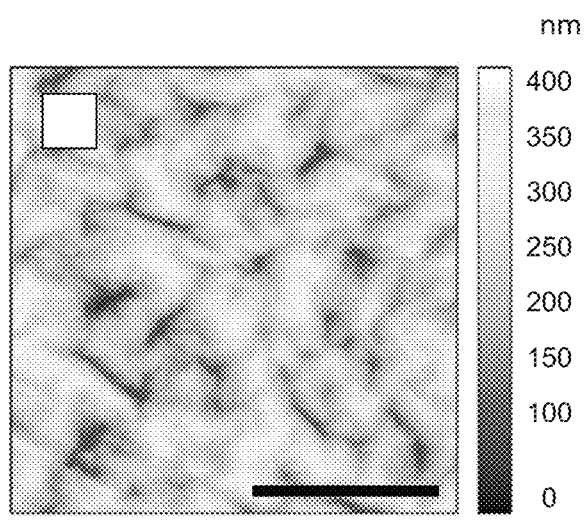

As mentioned above, the rGO films of the disclosure have minimal inflammatory (local or systemic) responses from the neural tissue when implanted. This can be explained at least partly because the upper surface of the rGO films of the disclosure which is in direct contact with biological tissue has low roughness and does not leave undesired residues. The roughness of the upper surface of the rGO film may be measured by Atomic force microscope (AFM). As shown in FIG. 2B it was observed that the surface of the rGO film of an embodiment of the disclosure had a root square mean roughness as low as about 55 nm for an area of 25×25 µm². This value is expected to prevent tissue damage as well as to promote adhesion and proliferation of cells while minimizing interaction with bacteria.

In one embodiment, optionally in combination with one or more features of the various embodiments described above or below, the upper surface of the rGO film of the disclosure, which is the one in direct contact with biological tissue when the film is implanted, has a root square mean roughness from 1 to 200, or from 10 to 100, or about 55 nm, for an area of 25×25 µm², as measured by Atomic force microscope (AFM).

Figure 3F:
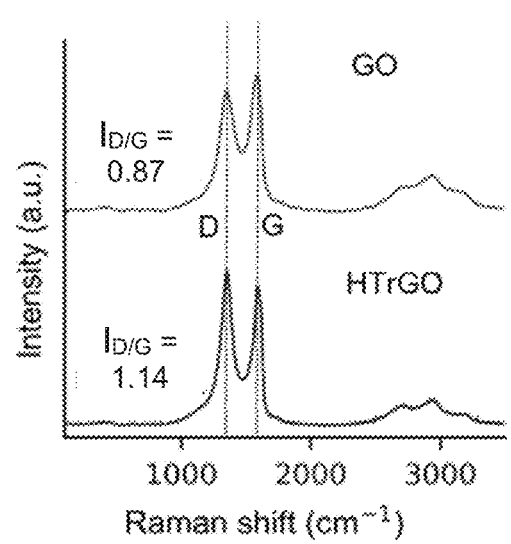

Raman spectroscopy may also be used for characterizing the reduced graphene oxide (rGO) film of the disclosure. The ratio of intensity D to G (D/G) bands is a measure of the defect present in the graphene structure. In one embodiment, optionally in combination with one or more features of the various embodiments described above or below, the reduced graphene oxide (rGO) film as defined above shows a D-to-G ratio (peak amplitude/peak amplitude) equal to or larger than 0.9, or from 0.9 to 2.4, or from 0.9 to 1.5, or of about 1.14 in the Raman spectrum for an area of 20×20 µm². In an embodiment, the reduced graphene oxide (rGO) film as defined above has the Raman spectrum as shown in FIG. 3F.

As mentioned above, the reduced graphene oxide (rGO) film of the disclosure exhibits high electrical conductivity in electrolyte-based systems. In one embodiment, optionally in combination with one or more features of the various embodiments described above or below, the reduced graphene oxide (rGO) film of the disclosure, when implemented in an electrode of about 25 micrometer diameter, is capable of providing a charge injection limit (CIL) from 2 to 10 mC/cm$^2$, and an impedance of 10 to 100 kΩ at a frequency of 1 kHz in an electrolyte-based system, or in an aqueous system.

Figure 5A:
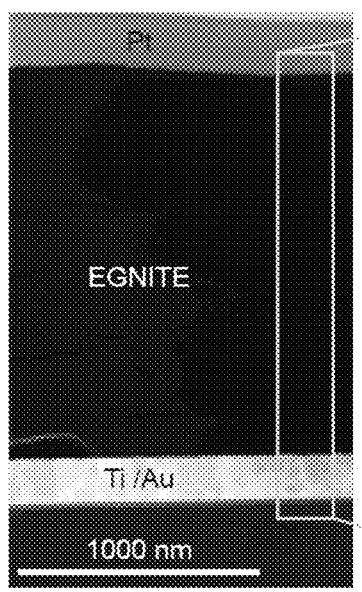
FIGS. 5A-C: Electron energy loss spectroscopy FIG. 5A High-angle annular dark-field (HAADF) scanning transmission electron microscopy (STEM) image of an EGNITE (example 5) lamella.
Figure 5B:
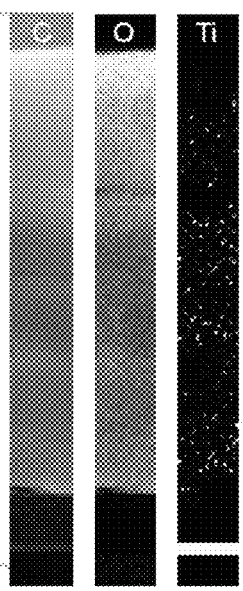
Figure 5C:
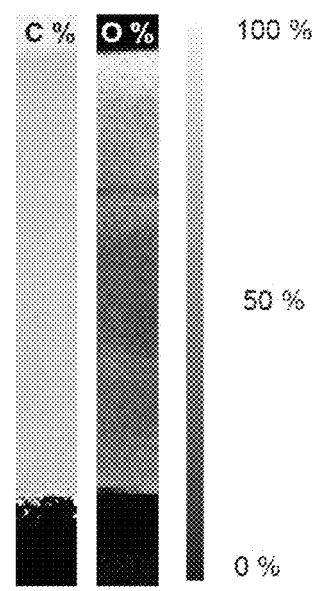

As a result of the process used for the preparation of the reduced graphene oxide (rGO) film of the disclosure, the elemental composition of the resulting rGO film has a reduced oxygen content in comparison to the unreduced film. The outer and inner chemical composition of the rGO film can be studied by X-ray photoelectron spectroscopy (XPS) and electron energy loss spectroscopy (EELS). In one embodiment, optionally in combination with one or more features of the various embodiments described above or below, the elemental composition of the outer surfaces of the rGO film and its inner part (bulk portion) is homogeneous (FIGS. 5A to C).

Thus, in one embodiment, optionally in combination with one or more features of the various embodiments described above or below, the elemental composition of the rGO film consists essentially of carbon in an amount equal to or more than about 80% of the atomic composition, and oxygen in an amount equal to or less than about 20% of the atomic composition, it consists essentially of carbon in an amount equal to or more than about 85% of the atomic composition, and oxygen in an amount equal to or less than about 15% of the atomic composition, and it consists essentially of carbon in an amount equal to or more than about 88% of the atomic composition, and oxygen in an amount equal to or less than about 12% of the atomic composition.

For the purposes of the disclosure, the term "the elemental composition consists essentially of" means that specific further components can be present in the film, namely those not materially affecting the essential characteristics of the reduced graphene oxide. In one embodiment, optionally in combination with one or more features of the various embodiments described above or below, the elemental composition of the rGO film consists of carbon and oxygen in the amounts mentioned above.

As mentioned above, the present disclosure also relates to an electrically back-contacted conductive reduced graphene oxide (rGO) structure comprising the rGO film as previously defined, and an additional conductive support on which the rGO is deposited.

For the purposes of the disclosure, the term "back-contacted" as used herein means that the rGO film is placed onto an additional conductive support, such that the lower surface of the film is in contact with one of the surfaces of the conductive support.

The additional conductive layer contributes to lowering the electrical access resistance of the rGO film of the disclosure.

In one embodiment, optionally in combination with one or more features of the various embodiments described above or below, the additional conductive support is selected from the group consisting of a metal, Single Layer Graphene (SLG), few layer layer graphene (FLG), and multilayer graphene (MLG). For example, the additional conductive support is a Single Layer Graphene (SLG). SLG is commercially available. Alternatively, it can be grown by chemical vapour deposition on a copper foil as shown in the examples.

Examples of metals that can be used as additional conductive supports include, without limitation, platinum, gold, iridium, tungsten, indium tin oxide, stainless steel, silver, copper, nickel, and alloys or combinations thereof.

The particular structure of the rGO material previously described may be achieved by a process including an evaporation step of graphene oxide or filtration step of graphene oxide on a membrane and subsequent transfer to a support and reduction of the material.

Therefore, it also forms part of the disclosure a reduced graphene oxide material as defined above, which is obtainable by a process which comprises hydrothermally reducing a GO film, such as at a temperature from 100 to 240° C., under a pressure from $10^5$ to $4·10^8$ Pa, for a time period from 1 min to 24 h, in the presence of water. Thus, the disclosure also relates to a hydrothermally reduced GO film as defined above.

As mentioned above, the present disclosure also relates to a reduced graphene oxide material as defined above, which is obtainable by a process which comprises the following steps:

filtering a graphene oxide (GO) solution through a porous membrane thereby forming a GO film on the membrane top, wherein the graphene oxide (GO) solution is and aqueous solution, the concentration of graphene oxide (GO) in the solution is from 0.001 to 5 mg/mL, and the volume filtered is from 5 to 1000 mL;

transferring the GO film from the membrane onto a sacrificial substrate, whereby the GO film is placed between the membrane at the top and the sacrificial substrate at the bottom;

removing the membrane, whereby the GO film remains attached onto the sacrificial substrate;

hydrothermally reducing the GO film to form a reduced GO material (rGO) at a temperature from 100 to 240° C., under a pressure from $10^5$ to $4·10^8$ Pa, for a time period from 1 min to 24 h, in the presence of water; and detaching the rGO material from the sacrificial substrate.

The expression composition "obtainable by the process" of the disclosure is used herein for defining the rGO material by its preparation process and refers to the rGO material that can be obtained through the preparation process which comprises the steps i) to v) as previously defined. For the purposes of the disclosure, the expressions "obtainable", "obtained" and similar equivalent expressions are used interchangeably and, in any case, the expression "obtainable" encompasses the expression "obtained".

The disclosure also relates to the process for the preparation of the reduced graphene oxide (rGO) film as defined above, which comprises the steps i) to v) as previously defined. An embodiment of the process for the preparation of the rGO film of the disclosure is depicted in FIGS. 1A to D.

The starting graphene oxide (GO) used in step i) of the process above is commercially available. Graphene oxide contains high-density oxygen functional groups, like hydroxyl and epoxy group on its basal plane, and carboxyl at its edge. It is synthesized dominantly via chemical oxidation of natural graphite even though there are a few reports on alternative electrochemical oxidation.

In one embodiment, optionally in combination with one or more features of the various embodiments described above or below, the graphene oxide (GO) solution of step i) is an aqueous solution. In certain embodiments, the graphene oxide (GO) solution used in step i) has a concentration from 0.001 to 5 mg/mL. Typically, the volume of GO solution which is filtered goes from 5 to 1000 mL.

In another embodiment, optionally in combination with one or more features of the various embodiments described above or below, the graphene oxide (GO) used in step i) has a typical carbon-to-oxygen ratio from 0.5 to 1.0. The carbon-to-oxygen ratio can be calculated from X-ray photoelectron spectroscopy (XPS).

In another embodiment, optionally in combination with one or more features of the various embodiments described above or below, the starting graphene oxide (GO) used in step i) is in the form of flakes of >200 nm and <20 µm, or >500 nm and <20 µm, wide and 0.3-100 nm thick.

In another embodiment, optionally in combination with one or more features of the various embodiments described above or below, the porous membrane used in step i) is made of a material selected from the group consisting of nitrocellulose.

The pores of the membrane used in step i) should be smaller than the size of the starting GO flakes. Typically, the membrane has a pore size from 0.025 µm to 200 µm.

The filtration of step i) can be carried out at a pressure equal or lower than atmospheric pressure, e.g. at a pressure from 1 to 100 KPa. Thus, in one embodiment, optionally in combination with one or more features of the various embodiments described above or below, step i) is carried out at a pressure from 1 to 100 KPa, or from 1 to 10 KPa.

As a result of the filtration step i) a GO film is formed on the membrane. In an embodiment, optionally in combination with one or more features of the various embodiments described above or below, once step i) is finished, the film is dried out at room temperature for 2-10 hours.

Alternatively, the filtering step in any of the processes of the disclosure may be carried out by evaporating a graphene oxide (GO) solution on a substrate, wherein the graphene oxide (GO) solution is and aqueous solution, the concentration of graphene oxide (GO) in the solution is from 0.001 to 5 mg/mL, and the volume is from 5 to 1000 mL.

All the embodiments mentioned above in connection with the processes of the disclosure, for the preparation of the rGO film or the electrically back-contacted conductive reduced graphene oxide (rGO) structure, which comprise the step of filtering a graphene oxide (GO) solution on a membrane also apply to the corresponding processes where a step of evaporating a graphene oxide (GO) solution is carried out instead of filtering a graphene oxide (GO) solution on a membrane.

In one embodiment, optionally in combination with one or more features of the various embodiments described above or below, after filtering step i) and before step ii) the back side of the membrane is hydrated. For instance, a wet paper is used for that purpose. Other solvents that, like water, are able to dissolve the GO which is in direct contact with the porous membrane and are able to pass through the membrane without damaging or dissolving it may also be used.

Depending on the amount of GO filtered, the number of layers and the thickness of the film may be varied resulting in a higher or lower transparency. Generally speaking, when a higher GO concentration is filtered, a larger number of layers is formed with the result of less transparency. Films thicker than 200 nm have an optical transmission below about 5% with respect to the total transmission in wavelengths from 400 to 1160 nm.

In an embodiment, optionally in combination with one or more features of the various embodiments described above or below, after step i) and before step ii) the membrane is inverted. In this case, the surface of the GO film that was initially on the top becomes the bottom surface and this surface is the one which is placed in contact with the sacrificial substrate in the following step.

The term "sacrificial substrate" as used herein means a substrate that is used to hold the reduced graphene oxide material of the disclosure and that is subsequently removed to produce a substrate free reduced graphene oxide material.

The sacrificial substrate used in step ii) can be rigid or flexible. It can be electrically conductive or not. Depending on the nature of the substrate it may be used as a definitive substrate when the reduced graphene oxide material of the disclosure further comprises an additional layer of conductive material which can be placed at the bottom of the GO film.

In one embodiment, optionally in combination with one or more features of the various embodiments described above or below, the substrate used in step ii) is selected from the group consisting of $SiO_2$ wafer, single layer graphene (SLG), few layer layer graphene (FLG), multilayer graphene (MLG), and a conductive metal compound. Non-limiting examples of conductive metal compound that can be used as a substrate include metals e.g. platinum, gold, titanium, iridium, tungsten, stainless steel, silver, copper, nickel, and alloys or combinations thereof, and also iridium oxide, silver chloride and tin nitride. For instance, the substrate used in step ii) is a $SiO_2$ wafer. Other substrates that may be used include polymers, such as polyimide or parylene C, deposited on top of $SiO_2$ wafers. The deposition techniques can be spin coating or evaporation.

Once the GO film is placed onto the substrate as mentioned above, the membrane can be optionally dried by e.g. blowing it with air/$N_2$ from the side which is not in contact with the GO film towards the substrate. Typically, air/$N_2$ is blowed from 1 to 60 seconds for this purpose.

In one embodiment, optionally in combination with one or more features of the various embodiments described above or below, the transfer of the GO film from the membrane onto a sacrificial substrate of step ii) is performed by placing the GO film attached to the membrane in contact with the sacrificial substrate, whereby the GO film is placed between the membrane at the top and the sacrificial substrate at the bottom, and the membrane is pressed (e.g. in a roller) with a pressure from 1-500 $Kg/cm^2$.

In step iii) the membrane is removed, whereby the GO film remains attached onto the sacrificial substrate only. In another embodiment, optionally in combination with one or more features of the various embodiments described above or below, the removal is performed by peeling off the membrane.

Then, the GO film on the substrate is hydrothermally reduced in step iv). The reduction is carried out in the presence of water, such as in an autoclave. Bases (such as $NH_3$) or acids (such as $HNO_3$ or HCl) can also be present. In one embodiment, optionally in combination with one or more features of the various embodiments described above or below, the hydrothermal reduction is carried out in the absence of any bases or acids or other components apart from water. Typically, the reduction is carried out at a temperature from 100 to 240° C., under a pressure from $10^5$ to $4·10^8$ Pa, or from $10^5$ to $10^6$ Pa, for a time period from 1 min to 24 h, or from 1 min to 20 h.

Even if the reduction is carried out in the presence of water, to obtain higher yield it is advantageous that the water from the autoclave is not in directly contact with the GO film. Thus, in one embodiment, optionally in combination with one or more features of the various embodiments described above or below, the hydrothermal reduction is carried out in a sealed container, such as in a Teflon lined container inside of an autoclave, such that the GO film is not in direct contact with water.

In another embodiment, optionally in combination with one or more features of the various embodiments described above or below, the reduction is carried out at a temperature from 100 to 240° C., or from 100 to 150° C., or at about 134° C.

In another embodiment, optionally in combination with one or more features of the various embodiments described above or below, the reduction is carried out at a pressure from $10^5$ to $4 \cdot 10^8$ Pa, or from $10^5$ to $10^6$ Pa, or from 100000 to 300000 Pa.

In another embodiment, optionally in combination with one or more features of the various embodiments described above or below, the hydrothermal reduction is carried out for a time period from 1 min to 24 h, or from 1 min to 20 h, or from 1 to 6 h, or about 3 h. Depending on the time used in this step, and as a consequence of the scope of the chemical reduction, the properties of the rGO, such as the capacitance of the resulting reduced GO film may be modulated.

Finally, to obtain the isolated rGO film, this is detached from the substrate. This can be done by immersing the reduced GO material (rGO) into water and recover the floating reduced GO material (rGO).

In an embodiment, optionally in combination with one or more features of the various embodiments described above or below, the disclosure also relates to the process for the preparation of the reduced graphene oxide (rGO) film as defined above, which comprises the following steps:
- filtering a graphene oxide (GO) solution through a porous membrane thereby forming a GO film on the membrane top, wherein the graphene oxide (GO) solution is and aqueous solution, the concentration of graphene oxide (GO) in the solution is from 0.001 to 5 mg/mL, and the volume filtered is from 5 to 1000 mL;
- drying out the film;
- hydrating the back side of the membrane;
- inverting the membrane;
- transferring the GO film from the membrane onto a sacrificial substrate, whereby the GO film is placed between the membrane at the top and the sacrificial substrate at the bottom;
- removing the membrane, whereby the GO film remains attached onto the sacrificial substrate;
- hydrothermally reducing the GO film to form a reduced GO material (rGO), for example, at a temperature from 100 to 240° C., under a pressure from $10^5$ to $4 \cdot 10^8$ Pa, for a time period from 1 min to 24 h, in the presence of water and
- detaching the rGO material from the sacrificial substrate.

In order to prepare the rGO material with an additional conductive layer to form an electrically back-contacted conductive reduced graphene oxide (rGO) structure as defined above, a process analogue to the process as previously described comprising steps i) to iv) may be used provided that instead of the sacrificial substrate the additional conductive layer is used. In this case, there is no need to carry out step v) (removal of the substrate to detach the rGO material).

Thus, in one embodiment, optionally in combination with one or more features of the various embodiments described above or below, the electrically back-contacted conductive reduced graphene oxide (rGO) structure as defined above is obtainable by the process comprising the following steps:
- i') filtering a graphene oxide (GO) solution through a porous membrane thereby forming a GO film on the membrane top, wherein the graphene oxide (GO) solution is and aqueous solution, the concentration of graphene oxide (GO) in the solution is from 0.001 to 5 mg/mL, and the volume filtered is from 5 to 1000 mL;
- ii') transferring the GO film from the membrane onto an additional conductive support, whereby the GO film is placed between the membrane at the top and the additional conductive layer at the bottom;
- iii') removing the membrane, whereby the GO film remains attached onto the additional conductive support; and
- iv') hydrothermally reducing the GO film to form a reduced GO material (rGO), for instance, at a temperature from 100 to 240° C., under a pressure from $10^5$ to $4 \cdot 10^8$ Pa, for a time period from 1 min to 24 h, in the presence of water.

Alternatively, the rGO material with the additional conductive layer may be prepared either by the process as described above comprising steps i) to v) and then attaching the graphene material to the additional conductive layer, or by the process as described above comprising steps i) to iv) and then transferring the graphene material to the additional conductive layer and removing the sacrificial substrate.

The embodiments mentioned above in connection with the process for the preparation of the rGO film also apply to the process for the preparation of the electrically back-contacted conductive reduced graphene oxide (rGO) structure.

In an embodiment, optionally in combination with one or more features of the various embodiments described above or below, the electrically back-contacted conductive reduced graphene oxide (rGO) structure is electrically activated in an electrolyte system, or in an aqueous environment. This activation comprises placing the material in an electrolyte and sending electrical signals through the material/electrolyte interface. This has the advantage that it improves the electrical conductivity and interfacial capacitance, while lowering the interfacial impedance. Typically, this process can be applied with no irreversible damage of the electrode until being able to inject up to 10 mC/cm$^2$, depending on the thickness of the rGO film.

As mentioned above, the reduced graphene oxide (rGO) materials with high charge injection properties may be used in the fabrication of electronic devices, or implantable devices, such as microelectrodes. Therefore, it also forms part of the disclosure, an electronic device for detecting, receiving and/or eliciting electrical signals, comprising the reduced graphene oxide (rGO) film or the electrically back-contacted conductive reduced graphene oxide (rGO) structure.

In one embodiment, optionally in combination with one or more features of the various embodiments described above or below, the electronic device as defined above is a neural electrode, such as a microelectrode. In some embodiments, the microelectrode is of round shape and has a diameter from 1 to 300 micrometers.

Examples of electronic devices (implantable and not implantable) that may be used as neural interfaces include, without limitation, cortical electrodes (used for intraoperative brain mapping), retina implants (used for improving vision), spinal cord stimulators (used in chronic pain), deep brain stimulation (DBS) implants (used in Parkinson), cochlear implants (used for improving hearing), vagal nerve stimulators (VNS) (used in epilepsy), sacral neurostimulators (used in neuromodulation for continence), and the like.

In one embodiment, optionally in combination with one or more features of the various embodiments described above or below, the electronic device as defined above comprises a flexible substrate patterned with conductive leads, e.g. metals like Au, Pt or other conductors such as indium tin oxides, on which the rGO film or the electrically back-contacted conductive rGO-based material is deposited, and an encapsulating (also denominated passivating or insulating layer) with openings on the top. The passivation layer covers the conductive leads and leaves exposed the graphene electrode layer.

For the purposes of the disclosure, the term "flexible" refers to the ability of the device to be bended without breaking or cracking. In one embodiment, optionally in combination with one or more features of the various embodiments described above or below, the flexible substrate is made of polyimide or parylene C.

In another embodiment, optionally in combination with one or more features of the various embodiments described above or below, the encapsulating layer is made of polyimide, parylene C or SU8 (e.g. SU-8 2000, Microchem) which is a high contrast, epoxy based photoresist designed for micromachining and other microelectronic applications.

The electronic device as defined above may have different shapes. Thus, a suitable shape may be chosen for each application. In one embodiment, optionally in combination with one or more features of the various embodiments described above or below, the implantable electronic device as defined above has a circular, hexagonal or annular cross-section.

In an embodiment, optionally in combination with one or more features of the various embodiments described above or below, the electronic device as defined above has a thickness from 10 to 30 μm.

A plurality of electrodes may be formed into an electrode array. Thus, in another embodiment, optionally in combination with one or more features of the various embodiments described above or below, the electronic device as defined above is an array of microelectrodes. The array may typically comprise from 4 to 256 microelectrodes, or circular-shaped microelectrodes with a diameter ranging from 5 to 100 micrometers. The microelectrodes may be spaced with an interelectrode distance that can typically range from 10 to 300 micrometers.

The electronic device may be fabricated by a process comprising the following steps: defining a metallic substrate, optionally deposition of SLG on the metal (optional) transferring an additional conductive layer, GO film preparation and transfer (upside/down) as previously described, defining the graphene-containing microelectrode, passivating and hydrothermally reducing the GO film embedded in the device as previously disclosed.

In on embodiment, the electronic device may be fabricated by a process comprising the following steps:
  patterning a first substrate (such as a $SiO_2$ wafer) with a photoresist using standard optical lithography methods to open a desired pattern, e.g. a circular pattern with a diameter of about 25 micrometers, in the photoresist;
  evaporating a layer of chromium, titanium and/or gold onto the first substrate of step a);
  removing the photoresist, e.g. by immersing the wafer in acetone, and then in isopropanol;
  blowing dry the first substrate of step c);
  optionally transferring an additional conductive layer as previously defined, e.g. SLG, onto the first substrate of step d);
  filtering a graphene oxide (GO) solution through a porous membrane thereby forming a GO film on the membrane top, wherein the graphene oxide (GO) solution is and aqueous solution, the concentration of graphene oxide (GO) in the solution is from 0.001 to 5 mg/mL, and the volume filtered is from 5 to 1000 mL;
  transferring the GO film from the membrane onto the conductive layer of step e); whereby the GO film is placed between the membrane at the top and the conductive layer at the bottom;
  removing the membrane, whereby the GO film remains attached onto the conductive layer;
  defining the area of the graphene-containing microelectrode by using a combination of photolithography and reactive ion etching;
  spin-coating a passivation of layer e.g. of polyimide; and curing it to insulate electrically the metallic contacts;
  patterning and opening the microelectrode regions with photolithography reactive ion etching through the passivation layer;
  hydrothermally reducing the microelectrode of step k) at a temperature from 100 to 240° C., under a pressure from $10^5$ to $4·10^8$ Pa, for a time period from 1 min to 24 h, in the presence of water.

The embodiments mentioned above in connection with the process for the preparation of the amorphous rGO film also apply to the process for the preparation of the electronic device.

Throughout the description and claims the word "comprise" and variations of the word, are not intended to exclude other technical features, additives, components, or steps. Furthermore, the word "comprise" encompasses the case of "consisting of". Additional objects, advantages and features of the disclosure will become apparent to those skilled in the art upon examination of the description or may be learned by practice of the disclosure. The following examples and drawings are provided by way of illustration, and they are not intended to be limiting of the present disclosure. Furthermore, the present disclosure covers all possible combinations of the embodiments described herein.

EXAMPLES

Morphological and Chemical Characterization of the Films of the Disclosure

The base-substrate for all characterization studies of the films of the disclosure was a square (1×1 $cm^2$) of $Si/SiO_2$ (400 μm/1 μm).

XPS

XPS measurements were performed with a Phoibos 150 analyzer (SPECS GmbH, Berlin, Germany) in ultra-high vacuum conditions (base pressure $5·10^{-8}$ Pa) with a monochromatic aluminium Kα x-ray source (1486.74 eV). Overview spectra were acquired with a pass energy of 50 eV and step size of 1 eV and high resolution spectra were acquired with pass energy of 20 eV and step size of 0.05 eV. The overall resolution in those last conditions is 0.58 eV, as determined by measuring the FWHM of the Ag 3d5/2 peak of sputtered silver.

XRD

XRD measurements (θ-2θ scan) were performed in a Materials Research Diffractometer (MRD) from Malvern PANalytical. This diffractometer has a horizontal omega-2theta goniometer (320 mm radius) in a four-circle geometry and it worked with a ceramic X-ray tube with Cu $K_α$ anode (λ=1.540598 Å). The detector used is a Pixcel which is a fast X-ray detector based on Medipix2 technology.

TEM

A FIB lamella was prepared Helios NanoLab DualBeam (LMA-INA, Zaragoza) for the cross-section study of the EGNITE sample. Structural analyses were performed by means of Transmission Electron Microscopy using a TECNAI F20 TEM operated at 200 kV, including HRTEM and HAADF-STEM techniques.

STEM-EELS

The STEM-EELS experiment was performed in a Tecnai F20 microscope working at 200 KeV, with 5 mm aperture, 30 mm camera length, convergence angle 12.7 mrad and collection angle 87.6 mrad. As we used 0.5 eV/px and 250 eV as starting energy in the core-loss acquisition, we did not acquire Si k-edge expected at 1839 eV, the Pt M-edge at 2122 eV and the Au M-edge at 2206 eV. The relative C—O atomic composition has been obtained focusing our attention in the GO layer and assuming that the edges analysed (C and O in our case) sum to 100%. This assumption is valid in our case as evidenced in the SI maps. The energy differential cross section has been computed using the Hartree-Slater model and the background using a power low model.

Example 1—Hydrothermally Reduced Graphene Oxide Film (HTrGO) onto $SiO_2$

The hydrothermally reduced graphene oxide film is synthesized in three steps:

Step 1: filtration. A 20 mL of a 0.15 mg/mL aqueous solution of graphene oxide (GO) (using N002-PS-1.0 Graphene Oxide solution, Angstron Materials, this GO typically exhibit a C/O ratio between 0.5 and 1.0) was filtered through a nitrocellulose membrane with pores of 25 nm (VSWP04700, MF-Millipore™ Membrane Filter, Hydrophilic, 0.025 µm, 47 mm, white, plain). Nominally, the GO solution contained flakes of 554 nm wide (average x-y lateral dimension) and 1-1.2 nm thick (average z-dimension). The filtration resulted on a GO film of 1500 nm thick on top of the membrane. The filtration process uses a pump that is capable of generating a vacuum of 10 KPa.

Step 2: transfer. Afterwards, the back side of the nitrocellulose membrane was rehydrated using 1 ml of dionized water per $cm^2$. Next, the membrane was placed against a $SiO_2$ wafer (MicroChemicals GmbH) with the GO film in between. Nitrogen was blown from the membrane side for 30 s and the membrane-GO film-$SiO_2$ was pressed by applying 20 kg/$cm^2$ for at least 1 second. After this step, the membrane was peeled off of the $SiO_2$, and the GO film remained attached onto the $SiO_2$ wafer.

Step 3: reduction. Then, the $SiO_2$ wafer with the GO film was placed into an autoclave and hydrothermally reduced for 3 hours at 135° C.

Figure 4B:
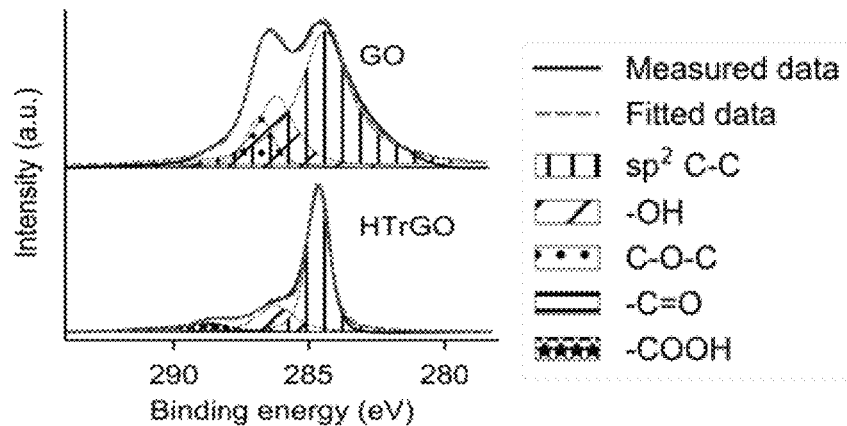
FIG. 4B C1s peak of GO and HTrGO showing a decrease of the oxygen-related bondings, typical of a reduction process.
Figure 4C:
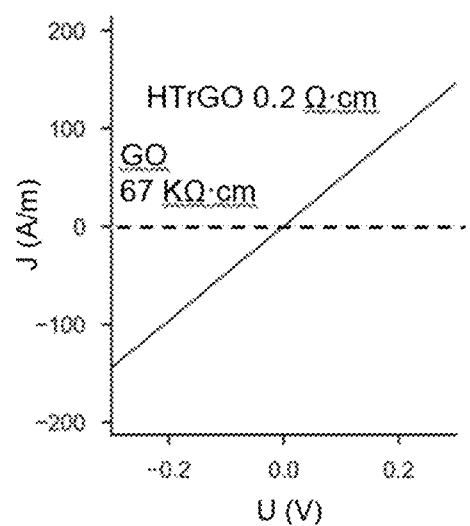
FIG. 4C Resistivity of the GO and HTrGO films. Hydrothermal reduction of GO led to a decrease in the measured resistivity from about 67 kΩ·cm to about 0.2 Ω·cm.

Films prepared as described above exhibited the following characteristics:

Reduced GO as shown by XPS (FIGS. 4A and 4B)

Example 2—Hydrothermally Reduced Graphene Oxide Film (HTrGO) with Additional Conductive Support (Single Layer Graphene)

Single layer graphene (SLG) was grown by chemical vapour deposition on a copper foil (Alfa Aesar Coated). The copper foil was loaded in a planar quartz tube (length: 1600 mm, inner diameter: 60 mm) heated by a three zone oven. A first annealing step at 1015° C. under a 400 sccm Argon flow at 10000 Pa (10 KPa) during 1 h was followed by a 15-min growth step at 1200 Pa (1.2 KPa) under a gas mix of 1000 sccm Argon, 200 sccm hydrogen and 2 sccm methane.

A wet chemical method was used to transfer the graphene from the copper foil to the $SiO_2$ substrate. First, a poly (methyl methacrylate) PMMA A2 (MicroChem) was deposited on the graphene/copper foil and was let dry for 12 h. Subsequently, the back side graphene was etched. To achieve this, the sample was laid at the surface of an etchant solution composed of $FeCl_3$/HCl (0.5M/2M) for 2 min. The back of the sample side was then flushed with water. The sample was laid on the etchant solution to remove the copper for at least 6 h. Then the sample was cleaned several times in water and transferred onto the $SiO_2$ wafer. The wafer was dried for 30 min at 40° C. on a hot plate and then gradually up to 180° C. annealed in a vacuum oven. Finally, the PMMA was dissolved in acetone and isopropanol.

A GO film was prepared and transferred as described in steps 1 and 2 of Example 1, in which the $SiO_2$ wafer was substituted by the SLG/$SiO_2$ stack described in this example. The transfer method used is the one described in Hébert, et al., Advanced Functional Materials, Vol. 28 (March 2018). Finally, the GO/SLG/$SiO_2$ wafer was placed into an autoclave and hydrothermally reduced for 3 hours at 135° C.

The structural properties of the HTrGO were as in Example 1; however, the film was in this case placed on a conductive transparent layer (SLG).

Example 3—Microelectrode Based on a HTrGO/SLG Stack (EGNITE)

A single layer graphene (SLG) was grown as described in Example 2.

A metallic microelectrode was defined onto a $SiO_2$ wafer as follows. First, the wafer was patterned with a photoresist (AZ5214 MichroChemicals GmbH) using standard optical lithography methods; a circular pattern with a diameter of 25 micrometers was open in the photoresist. Afterwards, a layer of chromium (10 nm)/gold (200 nm) was evaporated onto the wafer. Afterwards, the photoresist was removed by immersing the wafer in acetone; then in isopropanol and finally the wafer was blown dry. Then, the SLG was transferred onto the wafer with the microelectrode as described in Example 2. The filtered GO film was transferred onto the SLG as described in steps 1 and 2 of Example 1, in which the $SiO_2$ wafer is now substituted by the SLG/$SiO_2$ stack described in Example 2. At this moment, the area of the graphene-containing microelectrode was defined by using a combination of photolithography and reactive ion etching. Next, a passivation of layer of polyimide PI 2611 (HD MicroSystems) was spin coated and cured to insulate electrically the metallic contacts. Then, the microelectrode regions were patterned with photolithography and opened with reactive ion etching through the polyimide.

Finally, the wafer containing the GO/SLG/metal microelectrode was placed into an autoclave and hydrothermally reduced for 3 hours at 135° C.

The electrochemical properties of the 25 micrometer diameter electrode were characterized in phosphate buffer solution (PBS) 0.5M with a SP-200 Bio-Logic potentiostat using a three-electrode configuration. The working electrode was connected to the graphene microelectrode, the counter electrode was a large platinum wire and the reference electrode was a Ag/AgCl.

Cyclic voltammetry characterization (between −0.9 and +0.9 V) revealed a quasi-ideal capacitive behavior with a wide potential window of 1.8 V. From these measurements, a capacitance of 50 mF/$cm^2$ (normalized by the geometrical area of the 25 micrometer diameter electrode) and charge storage capacitances (CSC) of 40 mC/$cm^2$ were obtained. The surface area to volume ratio (SAVR) is $2 \cdot 10^9$ $m^{-1}$.

To investigate the charge injection limit, current pulses experiments (pulse width of 1 ms) were injected to the microelectrode. This measurement proved that a charge injection limit of 8 mC/cm$^2$ could be injected without breaching the safety limits of the electrochemical potential window.

Electrochemical impedance spectroscopy of the microelectrode revealed an impedance of 20 kΩ at a frequency of 1 kHz.

Example 4—Flexible Microelectrode Array Based on a HTrGO/SLG Stack

An array of 64 microelectrodes, arranged in a 8×8 matrix and covering a total area of 1.44 mm$^2$ was prepared. The microelectrodes have a diameter of 25 μm and are spaced 300 μm from each other.

First, a 10 μm thick layer of Polyimide (PI, PI 2611 HD MicroSystems) was spin coated and cured on top of a SiO$_2$ wafer. On this substrate PI layer, gold leads (consisting of a bilayer of Ti and Au, 10 nm Ti and 200 nm Au) were patterned by optical lithography and electron-beam metal evaporation. This was followed by the SLG and the GO film transfer, and their patterning by photolithography and reactive ion etching. Next, a passivation layer of PI with openings on the microelectrodes prevented any leakage of the leads. Then, a combination of optical lithography and reactive ion etching was used to pattern the edges of the device by cutting the substrate and passivation layers of the PI. Finally, the devices were peeled off from the SiO$_2$ wafer and placed into the autoclave at 135° C. for 3 hours inside sterilization pouches.

The electrochemical properties (charge storage capacitance, charge injection limit, and impedance) of the microelectrodes in the flexible array are the same as the ones reported in Example 3 for the fabricated individual microelectrode.

Example 5—Flexible Microelectrode Array Based on a HTrGO with Additional Conductive Support (Gold) (EGNITE)

Devices were fabricated on 4" Si/SiO$_2$ (400 μm/1 μm) wafers. First, a 10 μm thick layer of polyimide (PI-2611, HD MicroSystems) was spin coated on the wafer and baked in an atmosphere rich in nitrogen at 350° C. for 30 minutes. Metallic traces were patterned using optical lithography of the image reversal photoresist (AZ5214, Microchemicals GmbH, Germany). Electron-beam evaporation was used to deposit 20 nm of Ti and 200 of Au.

A GO film was prepared and transferred as described in steps 1 and 2 of Example 1, in which the SiO$_2$ wafer was substituted with gold polyimide silicon oxide, the film was then structured using a 100 nm thick aluminium mask. For instance, columns of aluminum were e-beam evaporated and defined on top of the future microelectrodes via lift off by using a negative photoresist (nLOF 2070, Microchemicals GmbH, Germany). Next, the GO film was etched everywhere apart from the future microelectrodes using an oxygen reactive ion etching (RIE) for 5 minutes at 500 W. The protecting Al columns were subsequently etched with a diluted solution of phosphoric and nitric acids. The resulting GO film at this step was completely laying on top of the electrical conductor substrate. After, a 3 μm thick layer of PI-2611 was deposited onto the wafer and baked as done before. PI-2611 openings on the microelectrode were then defined using a positive thick photoresist (AZ9260, Microchemicals GmbH, Germany) that acted as a mask for a subsequent oxygen RIE. Later, the devices were patterned on the PI layer using again AZ9260 photoresist and RIE. The photoresist layer was then removed in acetone and the wafer cleaned in isopropyl alcohol and dried out. Finally, the devices were peeled off from the wafer, placed in sterilization pouches and hydrothermally reduced at 134° C. in a standard autoclave for 3 hours.

Films prepared as described above exhibited the following characteristics:

Film having a total thickness of about 1500 nm comprising a stack of rGO layers (see FIG. 2A);
Root square mean roughness of about 55 nm for an area of 25×25 μm$^2$ (FIG. 2B)
Interstacking distance of about 0.4 nm as revealed by HRTEM (FIGS. 3A-D) and XRD (FIG. 3E)
The D-to-G ratio in the Raman spectrum was 1.14, for an area of 20×20 μm$^2$, indicating a defective carbon material (see FIG. 3F).
Resistivity of about 0.2 Ω·cm (FIG. 4C)
the elemental composition of the bulk of the film, deduced from EELS-EDX, was more than 85% of carbon and less than 15% oxygen (FIGS. 5A-C).

Example 6—In Vivo Recording of the Cortical Activity in Rodents

This section presents the suitability of the microelectrode array of Example 4 to record in vivo neural activity with low noise. For that, a flexible micro electrocorticography (μECoG) device containing the array of microelectrodes according to the disclosure was placed on the surface of the auditory cortex while an auditory stimulus was presented to record the neurophysiological activity on that area (FIG. 6A).

Design of the devices used. Two flexible micro electrocorticography devices were used: one based on the array of the disclosure (designated as EGNITE) and another on platinum (Pt). Both devices consisted of a flexible array of 64 microelectrodes. The diameter of the microelectrodes of the disclosure was 25 μm while the diameter of the Pt electrodes was 60 μm. The spacing between microelectrodes was 300 μm for the array of the disclosure and 500 μm for the Pt array.

Fabrication of the devices used. The device according to the disclosure was fabricated as explained in Example 4. The Pt-based device was acquired commercially (E64-500-20-60, NeuroNexus, USA).

Characterization of the devices used. Prior to starting the experiment, the impedance of both arrays was measured at 1 kHz. A median impedance of 55±15 kΩ was obtained for the device according to the disclosure, while 650±200 kΩ was obtained for the Pt array (FIG. 6B).

In vivo neural recording setup and protocol. Next, the microelectrocorticography (μECoG) devices were placed not simultaneously on the auditory neocortex of rodents (device according to the disclosure in FIG. 6C) and pure tones of 8 kHz were displayed. The neurophysiological signal was amplified, multiplexed, digitalized and high pass filtered at 0.1 Hz.

In vivo neural recording results. FIGS. 6D and E show the signal recorded by the device according to the disclosure and the Pt device, respectively. On both of them, an evoked local field potential (LFP) could be detected reaching an amplitude of about 500 μV with respect to the baseline around 30 ms after the onset of the audio signal. Only the microelectrode of the disclosure recorded an LFP on the offset of the audio signal, probably due to its localization on the auditory cortex. The intrinsic noise of the electrodes under post mortem conditions is shown overlapped on the evoked LFP for the device according to the disclosure and for Pt also in FIGS. 6D and 6E, respectively. In case of the device according to the disclosure, it had a peak-to-peak amplitude of 12 µV, while Pt reached 15 µV.

The recording capabilities of device according to the disclosure can be further explored and compared with Pt studying the power spectral density (PSD) from the in vivo and post mortem signals (FIG. 6F). From the analysis of the post-mortem data, rms noise of 2.9 µV was obtained for the device according to the disclosure compared to 3.2 µV for Pt when the PSD was integrated between 10 Hz and 10 kHz. A PSD study of the in-vivo data indicated that the microelectrodes of the disclosure were capable of capturing more neurophysiological data than the Pt ones between 20 Hz and 10 kHz. This phenomenon could also be observed in FIG. 6G, in which the signal to noise ratio (SNR) was calculated using the in vivo and the post-mortem signals. There, due to the lower intrinsic noise of the microelectrodes of the disclosure with respect to Pt, the SNR of the device according to the disclosure outperformed Pt one order of magnitude from 2 Hz to 2 kHz and reached a factor of 5 in the range of 2-8 kHz.

Example 7—In Vivo Neural Activity Stimulation in Rats

Figure 7A:
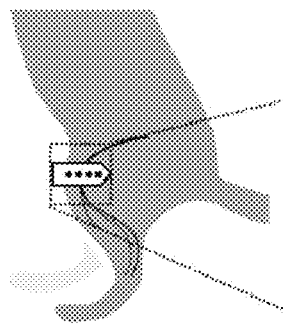
FIGS. 7A-E: Neural stimulation.

This section presents the suitability of the microelectrodes according to the V to be used in implantable neuroprosthetic devices for selective neural stimulation. For that, microelectrode arrays of example 4 were fabricated and implanted transversally in the sciatic nerve of rats in acute experiments. The devices selectively stimulated subsets of axons in different fascicles within the nerve while the activation of the plantar (PL), gastrocnemius (GM) and tibialis anterior (TA) muscles was recorded by electromyographic (EMG) signals (FIG. 7A).

Design of the devices used. The implant consisted of a long flexible and foldable stripe with 18 microelectrodes each with a diameter of 25 µm diameter according to the disclosure on the top side. The stripe was folded in a V-shape in such a way that the 18 microelectrodes were distributed in 2 arrays of 9, each facing one side of the stripe. This way, each of the 2 arrays span a total length of 1.2 mm, a length similar to the diameter of the sciatic nerve of rats.

Fabrication of the devices used. The device was fabricated as explained in Example 4.

Characterization of the devices used. Before starting the implantation, the microelectrodes were characterized, proving its suitability to reliably inject 8 mC/cm2 in biphasic pulses of 400 µA and 100 of µs/phase duration as well as an average impedance of 55±15 kΩ.

Figure 7B:
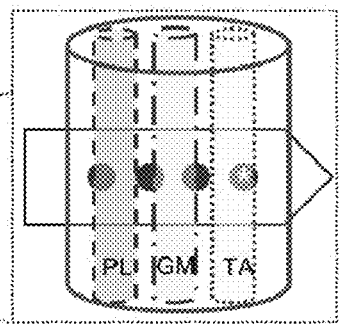
Figure 7C:
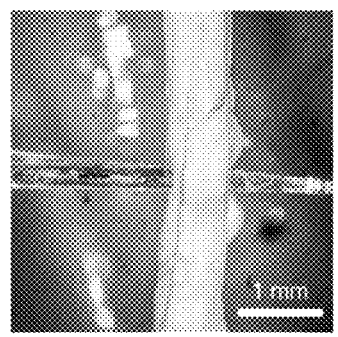

In vivo neural stimulation setup and protocol. Next, the device was implanted intrafascicularly into the sciatic nerve of an anesthetized rat in such a way that the 2 arrays of 9 microelectrodes were crossing the fascicles or subfascicles responsible for the innervation of the PL, GM and TA muscles (FIGS. 7B and 7C). Thereafter, electrical stimuli were injected in the nerve through each of the microelectrodes and the amplitude of the compound muscle action potentials (CMAP) elicited in the each of the three muscles was monitored through monopolar needles inserted into the GM, PL and TA muscle bellies. The measured amplitudes were normalized to the maximum CMAP amplitude obtained previously by external stimulation at supramaximal intensity using stainless-steel needle electrodes in the sciatic nerve. The stimuli consisted of trains of 100 biphasic pulses with increasing current amplitude that ranged from 0 to 100 µA against an external reference electrode placed proximally in the nerve.

Figure 7D:
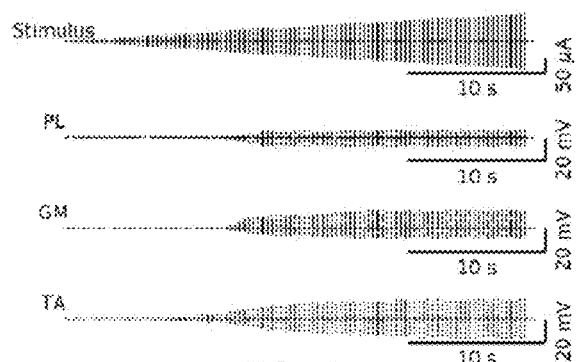
Figure 7E:
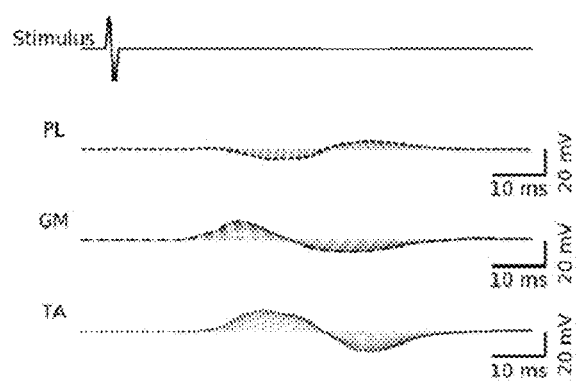
Figure 8:
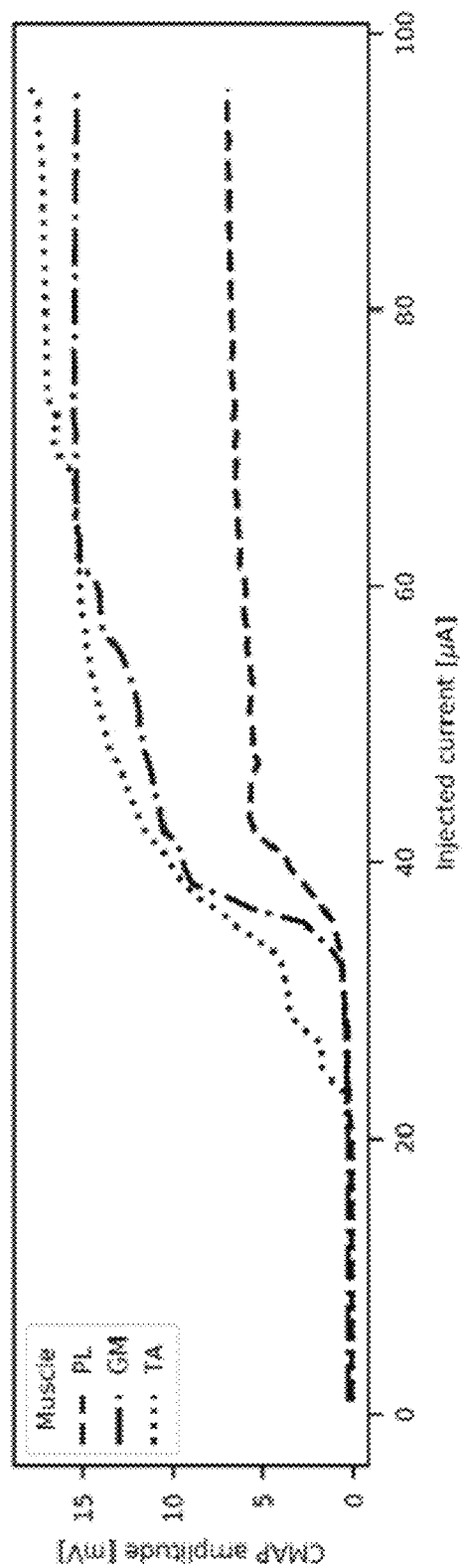
FIG. 8: CMAP of PL, GM, TA muscles normalized to the maximal response of one microelectrode (the one with the *). The fascicles closer to the microelectrode trigger a response at lower thresholds than the ones far away.

In vivo neural stimulation results. All three muscles, the PL, GM and TA exhibited contraction as a result of the triggered stimuli. (FIGS. 7D and 7E The delay between the stimulus and the muscular response was of about 20 ms due to the signal transmission time along the nerve. The muscular response increased with the amplitude of the injected current, occurring only above certain threshold. The injection of successively higher currents than the threshold eventually lead to the saturation of the muscular contraction (FIGS. 6A through 6G). Achieving low thresholds is of a major importance in order to minimise the possible damage in the tissue. Comparing the thresholds obtained with the device according to the disclosure with literature (Table 1), it arises that stimulation performed with microelectrodes according to the disclosure (EGNITE) can in all cases lower both the minimal activation threshold reported previously for the 5% and the 95%, by a factor 2 to 3.

TABLE 1

Activation thresholds for muscular responses of 5% and 95% of the supramaximal

| Ref. | material | Stimul. time (µs) | diameter (µm) | area (µm²) | PL muscle 5% | PL muscle 95% | GM muscle 5% | GM muscle 95% | TA muscle 5% | TA muscle 95% |
|---|---|---|---|---|---|---|---|---|---|---|
| Badia 2011 | Pt | 10 | 60 | 2827.4 | 58 ± 7 | 196 ± 33 | 55 ± 8 | 184 ± 32 | 66 ± 10 | 213 ± 31 |
| EGNITE | EGNITE | 100 | 25 | 490.9 | 25 ± 1 | 61 ± 1 | 27 ± 1 | 96 ± 1 | 23 ± 1 | 84 ± 1 |

Example 8—Biocompatibility Studies

Protein Adsorption on Substrates

Heat inactivated Foetal Bovine Serum (FBS; Sigma-Aldrich, Merck Sigma, UK) was drop-casted (150 µL) on four repeats of the different substrates (i.e. EGNITE of example 5; poly(3,4-ethylenedioxythiophene) polystyrene sulfonate, PEDOT:PSS, named hereafter PEDOT; or tissue culture polystyrene, TCPS). After 4 h incubation at room temperature, excess FBS was aspirated and the substrates were washed twice with PBS (Sigma-Aldrich, Merck Sigma, UK) to remove non-adsorbed proteins. Samples were then incubated at room temperature with 1% Sodium Dodecyl Sulfate (Sigma-Aldrich, Merck Sigma, UK) in distilled water (Millipore, Merck, UK) for 30 min to desorb the adsorbed proteins. Total protein content was quantified according to manufacturer's instructions using a Pierce BCA Assay Kit (Thermo Fisher Scientific, UK) and a spectrophotometry plate reader (Fluostar Omega, BMG Labtech, UK) working at 562 nm for absorbance measurements. According to the results obtained no significant difference between EGNITE and TCPS (tissue-culture polystyrene, the reference) is predicted in the ability of cells to attach and proliferate on the substrates.

Neuronal Cell Cultures

Human neuroblastoma cells (SH-SY5Y (ATCC® CRL-2266™), LGC standards, UK) were maintained in DMEM:F12 cell culture medium (Sigma-Aldrich, Merck Sigma, UK) supplemented with 20 mM glutamine (Sigma-Aldrich, Merck Sigma, UK), 10% FBS (Gibco, Thermo Fisher Scientific, UK), 1000 units penicillin, and 1 mg/mL streptomycin (Sigma-Aldrich, Merck Sigma, UK) at 37° C. in a humidified 5% CO2 incubator (NuAire, USA). Cells were passaged twice a week using a 0.05% Trypsin-EDTA solution (Sigma-Aldrich, Merck Sigma, UK) when reaching 80% confluence. All experiments were done using cells with a passage number below 20.

Cell Viability Assay

SHSY5Y cells were seeded at 50 000 cells per substrate (i.e. EGNITE of example 5; PEDOT; TCPS) in 12 well plate (1 mL final volume; Corning, USA). Positive controls for cell death were established by adding 10% DMSO to the media of cells grown on TCPS wells. After 24 h of cell growth on the different substrates, sterile-filtered resazurin solution, obtained by dissolving resazurin sodium salt (Sigma-Aldrich, Merck Sigma, UK) in PBS to make a 0.15 mg·mL-1 (10× solution), was added in each well to reach a 10 time dilution. Following 2 h incubation at 37° C., 150 µL of the cell culture supernatants were transferred to black 96 well plates (Greiner Bio-one, Germany), whereas the remaining media was aspirated, cells were washed with PBS, fresh complete cell culture medium was added, and cells were incubated at 37° C. for the next time point. The fluorescence coming from the 96 well plates was measured using a Fluostar Omega plate reader (BMG Labtech, UK) at an excitation wavelength of 560 nm and emission of 590 nm. Fluorescence values were normalised to mean fluorescence for TCPS samples. After 48 h of cell growth on the different substrates, the same procedure was performed. The remaining cells at 48 h were used to performed cell counting (Trypan Blue assay).

Cell Counting Assay

SHSY5Y cells were seeded at 50 000 cells per substrate (i.e. EGNITE of example 5; PEDOT; TCPS) in 12 well plate (1 mL final volume; Corning, USA). DMSO 10% added to cells grown on TCPS substrate was used as positive control in this assay. After 48 h of cell growth, supernatant was discarded and cells were washed twice with PBS (Sigma-Aldrich, Merck Sigma, UK), before a solution of trypsin-EDTA was applied (0.05%; Sigma-Aldrich, Merck Sigma, UK) to detach the cells. An aliquot of the cell suspension was then mixed 1:1 with sterile solution of trypan blue (0.4%; Thermo Fisher Scientific, UK), before cell counting was performed using an hemocytometer (BRAND counting chamber BLAUBRAND Neubauer improved).

Cytotoxicity Assay

SHSY5Y cells were seeded at 50 000 cells per substrate (i.e. EGNITE of example 5, PEDOT, or TCPS) in 12 well plates (i.e. 1 mL final volume). DMSO 10% added to cells grown on TCPS substrate was used as positive control in this assay. To assess cytotoxicity, a modified version of the Lactate DeHydrogenase (LDH) assay was performed (Cyto-Tox 96 nonradioactive cytotoxicity assay, Promega LDH assay Kit). Briefly, supernatant media was aspirated, and cells were washed twice with PBS. Live cells at the bottom of the well were then lysed with 200 µL lysis solution (Triton X (Sigma Aldrich) at 0.9% in water), 45 min at 37° C. Cell lysates (50 µL) was mixed 1:1 with LDH reaction solution. Mixtures were incubated for 15-20 min at room temperature until a steady red colour appears, before 50 µL of stop solution was added to each well. The absorbance of the wells was then measured at 490 nm using a Fluostar Omega plate reader (BMG Labtech, UK). The absorbance values were expressed relative to the TCPS controls.

The above experiments showed the increased viability and cell proliferation relative to the TCPS, after 48 hrs culture on EGNITE films.

Primary Hippocampal Neuron Growth on EGNITE

Primary neuron cell cultures were prepared from hippocampus extracted from three-day old neonatal rat brain (REF Pacific). Sacrifice of the neonatal animals was performed in accordance with the UK Animals (Scientific Procedures) Act 1986 and the ARRIVE guidelines, following ethical approval from the UK Home Office, under Project License no. P089E2E0A. After determination of the number of live cells, cells were plated on either glass coverslip or EGNITE of example 5, both pre-coated with 50 µg/mL poly-L-lysine, at a density of 40 000 cells per substrate in serum-free neurobasal medium (Gibco, Thermo Fisher Scientific, UK) containing B27 supplement (Gibco, Thermo Fisher Scientific, UK), 1000 units penicillin and 1 mg/mL streptomycin (Sigma-Aldrich, Merck Sigma, UK), as well as 0.5 mM glutamine (Sigma-Aldrich, Merck Sigma, UK) for the first 3 days. Cultures were maintained at 37° C. in a humidified 5% CO2 incubator (NuAire, USA) for 14 days; half of the volume of the wells was changed every three days.

Immunostaining of Cells

After culture, both SHSY5Y and primary neurons were washed with PBS (Sigma-Aldrich, Merck Sigma, UK) three times before being fixed at room temperature for 10 min with 4% PFA (Sigma-Aldrich, Merck Sigma, UK) in PBS. Then, fixed cells were permeabilized for 5 min with 0.1% Triton X (Sigma-Aldrich, Merck Sigma, UK) diluted in PBS, before being blocked for 1 hour with 5% PBS solution of goat serum (Sigma-Aldrich, Merck Sigma, UK). Cells were then incubated with a solution of primary antibodies for 2 h at room temperature (β-III Tubulin, ABCAM ab1827, Rabbit, used at 1:200). Following the incubation with primary antibodies, cells were washed three times with PBS, before being incubated for 1 h at room temperature with secondary antibodies (Anti-Rabbit conjugated with CY3, Jackson 111-165-144, used at 1:100). After staining, cells were thoroughly washed before being mounted with glass coverslips in Prolong Gold Antifade mountant containing DAPI (Invitrogen, Thermo Fisher Scientific, UK). It was observed that cells were more spread, healthy and numerous on EGNITE compared to PEDOT:PSS or TCPS.

Microscopy Imaging of β-III Tubulin Immunoreactivity

Confocal Laser Scanning Microscopy was performed on a Zeiss LSM 880 (Systems Microscopy Centre, Manchester Bioimaging Facility, Faculty of Biology, Medicine and Health, the University of Manchester). Images were captured using a 1 AU pinhole and 2% Laser power. Image processing was performed post-hoc using the Zeiss ZEN software package. Displayed images are a maximum intensity projection of 10 confocal slices; scale bars are 100 µm.

According to the results obtained, after 14 days of culture, neurons grown on EGNITE formed a network of well-individualised and branched neurons, while neurons grown on glass coverslips tended to agglomerate and their extensions bundled.

Statistical Analysis

The Mann-Whitney U test using Graphpad Prism software was applied to all in vitro cell cultures assays. For all experiments, p values were displayed as: (*) p<0.05; () p<0.01; (*) p<0.005; (****) p<0.0001.

CITATION LIST

Hébert, et al., "*Flexible Graphene Solution-Gated Field-Effect Transistors: Efficient Transducers for Micro-Electrocorticography*", Advanced Functional Materials, Vol. 28 (12), (March 2018).
Badia, et al, "*Comparative analysis of transverse intrafascicular multichannel, longitudinal intrafascicular and multipolar cuff electrodes for the selective stimulation of nerve fascicles*", J Neurl Eng, June 2011.
Taer, E., et al., "*The Relationship of Surface Area to Cell Capacitance for Monolith Carbon Electrode from Biomass Materials for Supercapacitor Application*", Journal of Physics: Conference Series, Volume 1116, Issue 3
Hess, Lucas H. et al., "Graphene Transistors for Bioelectronics." Proceedings of the IEEE|Vol. 101, No. 7, July 2013).

The invention claimed is:
1. A process for the preparation of an electrically back-contacted conductive reduced graphene oxide (rGO) structure, said structure comprising:
  a reduced graphene oxide (rGO) film having a total thickness from 20 nm to 5 micrometers, wherein the rGO film comprises a stack of rGO layers comprising flakes, and wherein a distance between two consecutive rGO layers is from 0.2 to 0.7 nm, and
  an additional conductive support on which the rGO film is deposited, wherein back-contacted means that the rGO film is placed onto the additional conductive support, such that a lower surface of the film is in contact with one of the surfaces of the conductive support, and
  wherein the process for the preparation of the electrically back-contacted conductive reduced graphene oxide (rGO) structure comprises the following steps:
  i') filtering a graphene oxide (GO) solution through a porous membrane thereby forming a GO film on the membrane top, wherein the graphene oxide (GO) solution is an aqueous solution, the concentration of graphene oxide (GO) in the solution is from 0.001 to 5 mg/mL, and the volume filtered is from 5 to 1000 mL;
  ii') transferring the GO film from the membrane onto the additional conductive support, whereby the GO film is placed between the membrane at the top and the additional conductive layer at the bottom;
  iii') removing the membrane, whereby the GO film remains attached onto the additional conductive support; and
  iv') hydrothermally reducing the GO film to form a reduced GO material (rGO), at a temperature from 100 to 240° C., under a pressure from $10^5$ to $4 \cdot 10^8$ Pa, for a time period from 1 min to 24 h, in the presence of water.
2. A process for the preparation of an electrically back-contacted conductive reduced graphene oxide (rGO) structure according to claim 1, wherein the distance between two consecutive layers of the rGO film is from 0.3 to 0.5 nm.
3. A process for the preparation of an electrically back-contacted conductive reduced graphene oxide (rGO) structure according to claim 1, wherein the total thickness of the rGO film is from 500 to 2000 nm.
4. A process for the preparation of an electrically back-contacted conductive reduced graphene oxide (rGO) structure according to claim 1, wherein the stack of rGO layers in the rGO film comprises from 100 to 500000 layers of flakes.
5. A process for the preparation of an electrically back-contacted conductive reduced graphene oxide (rGO) structure according to claim 1, wherein the rGO film has a carbon-to-oxygen ratio from 0.8 to 2.0 as measured by X-ray photoelectron spectroscopy (XPS).
6. A process for the preparation of an electrically back-contacted conductive reduced graphene oxide (rGO) structure according to claim 1, wherein the rGO film shows a X-ray diffraction spectra in which a peak at 11±0.5, σ=4, degrees 2 theta measured in an X-ray diffractometer with CuKα radiation (1.540598 Å) characteristic of non-reduced graphene oxide is substantially absent, wherein substantially absent means that the % area/area of the peak at 11±0.5 is equal to or less than about 1%.
7. A process for the preparation of an electrically back-contacted conductive reduced graphene oxide (rGO) structure according to claim 1, wherein the rGO film shows a peak at 23±0.5, σ=4, degrees 2 theta in the X-ray diffraction spectra measured in an X-ray diffractometer with CuKα radiation (1.540598 Å).
8. A process for the preparation of an electrically back-contacted conductive reduced graphene oxide (rGO) structure according to claim 1, wherein the rGO film has an upper surface, and the upper surface of the rGO film has a root square mean roughness from 1 to 200 nm, for an area of 25×25 μm$^2$, as measured by Atomic force microscope (AFM).
9. A process for the preparation of an electrically back-contacted conductive reduced graphene oxide (rGO) structure according to claim 1, wherein the rGO film shows a D-to-G ratio equal to or larger than 0.9 in a Raman spectrum for an area of 20×20 μm$^2$.
10. A process for the preparation of an electrically back-contacted conductive reduced graphene oxide (rGO) structure according to claim 1, wherein the rGO film shows resistivity from about 0.01 to 10 Ω·cm.
11. A process for the preparation of an electrically back-contacted conductive reduced graphene oxide (rGO) structure according to claim 1, wherein the elemental composition of the rGO film consists essentially of carbon in an amount equal to or more than about 80% of an atomic composition, and oxygen in an amount equal to or less than about 20% of the atomic composition.
12. A process for the preparation of an electrically back-contacted conductive reduced graphene oxide (rGO) structure according to claim 1, wherein the rGO film is capable, when implemented in an electrode with a diameter of about 25 micrometers, of providing a charge injection limit (CIL) from 2 to 10 mC/cm$^2$, and/or an impedance of 10 to 100 kΩ at a frequency of 1 kHz in an electrolyte-based system.
13. A process for the preparation of an electrically back-contacted conductive reduced graphene oxide (rGO) structure according to claim 1, wherein the rGO film has a surface area to volume ratio (SAVR) from $10^8$ to $10^{10}$ m$^{-1}$.
14. An electronic device for detecting, receiving and/or inducing electrical signals, comprising:
  a reduced graphene oxide (rGO) film having a total thickness from 20 nm to 5 micrometers, wherein the rGO film comprises a stack of rGO layers comprising flakes, wherein a distance between two consecutive layers is from 0.2 to 0.7 nm, wherein the reduced graphene oxide (rGO) film is obtainable by a process which comprises the following steps:

i) filtering a graphene oxide (GO) solution through a porous membrane thereby forming a GO film on a membrane top, wherein the graphene oxide (GO) solution is an aqueous solution, the concentration of graphene oxide (GO) in the solution is from 0.001 to 5 mg/mL, and the volume filtered is from 5 to 1000 mL;

ii) transferring the GO film from the membrane onto a sacrificial substrate, whereby the GO film is placed between the membrane at the top and the sacrificial substrate at the bottom;

iii) removing the membrane, whereby the GO film remains attached onto the sacrificial substrate;

iv) hydrothermally reducing the GO film to form a reduced GO material (rGO) at a temperature from 100 to 240° C., under a pressure from $10^5$ to $4 \cdot 10^8$ Pa, for a time period from 1 min to 24 h, in the presence of water; and v) detaching the rGO material from the sacrificial substrate the electronic device further comprising:

a flexible substrate patterned with conductive leads, on which the rGO film or an electrically back-contacted conductive rGO structure is deposited, and an encapsulating layer with openings on the top.

* * * * *